US008177248B2

(12) United States Patent
Rousseau

(10) Patent No.: US 8,177,248 B2
(45) Date of Patent: May 15, 2012

(54) WHEELCHAIR WITH MANUAL LIFT AND METHODS OF USING SAME

(75) Inventor: Bradley J. Rousseau, White Bear Lake, MN (US)

(73) Assignee: Safe and Secure Products, White Bear Lake, MN (US)

( * ) Notice: Subject to any disclaimer, the term of this patent is extended or adjusted under 35 U.S.C. 154(b) by 0 days.

(21) Appl. No.: 13/183,207

(22) Filed: Jul. 14, 2011

(65) Prior Publication Data

US 2011/0266771 A1 Nov. 3, 2011

Related U.S. Application Data

(63) Continuation of application No. 12/629,448, filed on Dec. 2, 2009.

(51) Int. Cl.
*B62M 1/14* (2006.01)

(52) U.S. Cl. .................................. 280/250.1; 280/304.1

(58) Field of Classification Search ............... 280/250.1, 280/304.1
See application file for complete search history.

(56) References Cited

U.S. PATENT DOCUMENTS

| | | | | |
|---|---|---|---|---|
| 3,485,510 A * | 12/1969 | Merlan | ......................... | 280/250 |
| 4,227,742 A | 10/1980 | Thomas | | |
| 4,441,710 A | 4/1984 | Lay | | |
| 4,455,029 A | 6/1984 | Taylor | | |
| 4,720,117 A * | 1/1988 | Hay | .............................. | 280/250 |
| 4,790,553 A | 12/1988 | Okamoto | | |
| 4,963,762 A | 10/1990 | Brooks | | |
| 4,988,114 A | 1/1991 | Thornton, Jr. et al. | | |
| 4,997,426 A | 3/1991 | Dingeman et al. | | |
| 5,076,390 A | 12/1991 | Haskins | | |
| 5,470,093 A | 11/1995 | Kiser | | |
| 5,501,480 A * | 3/1996 | Ordelman et al. | ......... | 280/304.1 |
| 5,899,476 A * | 5/1999 | Noyola | ...................... | 280/250.1 |
| 6,182,529 B1 | 2/2001 | White | | |
| 6,494,475 B2 | 12/2002 | Rossi et al. | | |

(Continued)

FOREIGN PATENT DOCUMENTS

EP 0 181 708 A1 5/1986

(Continued)

OTHER PUBLICATIONS

PCT International Search Report and Written Opinion for International Application No. PCT/US2010/058678, dated Sep. 1, 2011, 6 pages.

(Continued)

*Primary Examiner* — Joanne Silbermann
*Assistant Examiner* — Marlon Arce
(74) *Attorney, Agent, or Firm* — Patterson Thuente Christensen Pedersen, P.A.

(57) ABSTRACT

A device that detachably mounts to the front side of a wheelchair frame, or similar vehicle, to manually lift or otherwise manipulate an occupied wheelchair p and/or down stairs. The manual wheelchair lift attachment comprises a wheelchair attachment portion and a handhold member for lifting that is connected by connecting arms. The wheelchair lift attachment apparatus may be adjustable to be configured with different sized wheelchairs. The invention also relates to a wheelchair having a permanent wheelchair frame that operably accepts a lifting mechanism apparatus. The invention also relates to a method of using the foregoing attachment and permanent configuration to transport an occupied wheelchair up and/or down stairs or otherwise maneuver the occupied wheelchair about other similar obstacles.

20 Claims, 18 Drawing Sheets

U.S. PATENT DOCUMENTS

| | | | | |
|---|---|---|---|---|
| 6,851,751 | B1 | 2/2005 | Romero et al. | |
| 7,540,504 | B2 | 6/2009 | Ehman et al. | |
| 7,896,376 | B2 | 3/2011 | Dauw et al. | |
| 2008/0067777 | A1 | 3/2008 | Dauw et al. | |
| 2008/0197598 | A1* | 8/2008 | Mills et al. | 280/250.1 |
| 2008/0315549 | A1* | 12/2008 | Dougherty | 280/250.1 |
| 2010/0117328 | A1* | 5/2010 | Johnson et al. | 280/250.1 |
| 2011/0127748 | A1 | 6/2011 | Rousseau | |

FOREIGN PATENT DOCUMENTS

| | | | |
|---|---|---|---|
| EP | 2 090 276 | A1 | 8/2009 |
| WO | WO 2007/045083 | A1 | 4/2007 |

OTHER PUBLICATIONS

Application and File History for U.S. Appl. No. 12/629,448, filed Dec. 2, 2009. Inventor: Bradley J. Rousseau.

* cited by examiner

WHEELCHAIR WITH MANUAL LIFT AND METHODS OF USING SAME

RELATED APPLICATION

This application is a continuation of application Ser. No. 12/629,448 filed Dec. 2, 2009, which is hereby fully incorporated herein by reference.

FIELD OF THE INVENTION

The invention relates generally to wheelchairs. More particularly, this invention relates to a device that attaches to the front side of a wheelchair frame, or similar vehicles, to manually lift or otherwise manipulate such wheelchairs and its occupant up and/or down stairs. The manual wheelchair lift attachment device also functions as a brace to protect collapsible wheelchairs against unintended collapse. The manual wheelchair lift attachment device further functions as a footrest for its occupant. The invention also relates to a wheelchair having a permanent wheelchair frame that operably accepts a lifting mechanism. The invention also relates to a method of using the foregoing attachment or alternative permanent configuration to transport a wheelchair occupant up and/or down stairs.

BACKGROUND OF THE INVENTION

Wheelchairs are ubiquitous and come in many different styles, models, and sizes. Wheelchair users are faced with many problems, but one of the most common problems wheelchair users face is overcoming obstacles that inhibit their ability to traverse their surroundings that are not relatively smooth and flat or otherwise wheelchair friendly, such as stairs that inhibit their ability to move between floors or levels of a building. The ability to overcome the problem associated with stairs has been addressed on multiple levels. For instance, laws and regulations have been passed by governments or agencies requiring buildings to be handicap accessible. Whether a result of such rules and regulations or the purpose of addressing this problem, many devices have been developed to help wheelchair users traverse flights of stairs or otherwise move between levels in a building (e.g., elevators, motorized wheelchair lifts, ramps, stair and step climbing wheelchairs, and the like). Despite all these efforts, there are numerous situations and locations where these efforts may not be practical or even possible.

For instance, acquiring many of the foregoing devices in order to traverse flights of stairs may not be financially practical for someone with a limited source of income or monetary means. Further, some individuals may be wheelchair-bound for a temporary basis before recovery and the cost associated with acquiring such devices may not make long-term financial sense. Other individuals may be wheelchair-bound as a result of deteriorating health and such devices may not be a practical solution. Still further, a wheelchair user's home may not be able to be equipped with an elevator or even a ramp. Many other buildings throughout the world, such as churches, office buildings or other institutions, may not be able to incorporate such devices due to space constraints, the layout of the building, monetary considerations, or other such reasons.

As a result, when a wheelchair user wants or otherwise needs to traverse a flight of stairs in buildings where such devices are not present, an attendant such as family, friends or even acquaintances may help the wheelchair user up the stairs and/or down the stairs by lifting or otherwise physically manipulating the wheelchair and its user with respect to the stairs. During this process, the people helping the wheelchair user are susceptible to getting injured by improper lifting techniques that may be employed as a result of the situation. The people helping the wheelchair user may also have their own health problems that may be affected by strenuous lifting or maneuvering of a wheelchair and its occupant. Also, due to the weight of the wheelchair and the occupant, the wheelchair occupant is susceptible of being dropped or otherwise injured should one of the people helping either get hurt or otherwise lose their grip and drop the wheelchair and its occupant.

Even when handicap accessible devices are present, the use of such devices may not be possible under the given situation. For instance, in the event of a fire or other emergency in hospitals, nursing homes, high-rise buildings, or other multi-leveled institutions that require those inside to evacuate, an elevator may not be accessible at all, or alternatively, filled to its capacity. As a result, the staircase may be the only remaining option for a wheelchair user to exit the building. In such situations, again, both the people helping the wheelchair user and the wheelchair user are susceptible to injury and even serious bodily harm.

It may be appreciated from the foregoing that there are many problems associated with the need to lift or otherwise maneuver a wheelchair and its occupant up and/or down flights of stairs. The present invention provides a solution for these and other problems.

SUMMARY OF THE INVENTION

It would be desirable to provide a wheelchair with permanent and/or attachment means which helps overcome the problems associated with lifting a wheelchair and its occupant up and/or down stairs. It would also be desirable to provide a wheelchair attachment that in the event of an emergency may be easily attached to a standard wheelchair to help facilitate moving the wheelchair and its occupant up or down a flight of stairs. It would also be desirable to provide a wheelchair attachment that may be easily attached and maintained on a standard wheelchair to help facilitate moving the wheelchair and its occupant that frequently must traverse a flight of stairs. It would also be desirable to provide a wheelchair attachment that may adjust to fit different sized wheelchairs. It would also be desirable to provide a wheelchair attachment that helps address the foregoing problems that is easy to use, robust, lightweight and cost-effective. It would also be desirable to provide a wheelchair with permanent structure that contains the entirety or a portion of such an attachment.

It is a present object of the present invention to provide a wheelchair lift apparatus that allows the front side of an occupied wheelchair to be easily lifted or otherwise maneuvered by an attendant, including attendants that are not trained or otherwise work in a healthcare environment.

It is another object of the present invention to provide a wheelchair lift apparatus that is easy to mount to the wheelchair, easy to use when detachably mounted, and safe.

It is another object of the present invention to provide a wheelchair lift apparatus that may be maintained on a standard wheelchair when not in use, while at the same time not being in the way of the user.

According to preferred embodiments of the invention, the invention is directed to a wheelchair lift apparatus that comprises a hand hold member connected to a wheelchair attachment portion by at least one connecting arm, and preferably two connecting arms. When the wheelchair lift apparatus is connected to the wheelchair, the attendant can lift up on the hand hold member to lift or other maneuver the front side of a wheelchair while another attendant uses the standard handles on the backside of the wheelchair. In a preferred embodiment, the wheelchair attachment portion detachably attaches to the two vertical frame members on the front side of the wheelchair by virtue of two plugs operably inserting into the hollow frame members. The two plugs are separated and supported by a lower horizontal member, or optionally vertical support members separated by the lower horizontal member. The wheelchair attachment portion also contains an upper horizontal member that presses against the vertical frame members of the wheelchair when the attendant lifts upwards on the hand hold member.

In a preferred embodiment, the wheelchair attachment portion contains a backing bar member that provides compression pressure with the upper horizontal bar to the two front vertical frame members. The backing bar member provides support to the wheelchair attachment portion in both the horizontal direction and the vertical direction by maintaining the plug members within the apertures of the two front vertical frame members.

In a preferred embodiment, at least one of the two plug members are adjustable with respect to the lower horizontal member to accommodate different sized wheelchairs, and alternatively both plug members are adjustable. The upper horizontal member may also be adjusted in the vertical direction with respect to the support members to provide additional support and safety measures.

In a preferred embodiment, the connecting arm members are adjustable between a retracted position and an extended position such that the hand hold members may abut the wheelchair attachment portion in the retracted position. In this embodiment, the hand hold members and connecting arm members may be maintained on the wheelchair in a position that is out of the way for the occupant's normal use, while conveniently being available for an attendant when the occupied wheelchair needs to be lifted up and/or down a flight of stairs or otherwise maneuvered.

In a preferred embodiment, the upper horizontal member contains frame engaging members that prevent the wheelchair from collapsing when the wheelchair lift apparatus is used. Each of the frame engaging members contact the two vertical frame members and may take on different configurations, such as hooking members, concave engaging members that engage a front side of the vertical frame member, bus members that engage the front side and an interior side of the vertical frame member, or a combination thereof.

In a preferred embodiment, the connecting arm members connect to the lower horizontal member such that the angle between the connecting arm members and the floor when the wheelchair lift apparatus is connected to the wheelchair is between zero degrees and thirty degrees. This angle provides an ergonomic advantage to the attendant on the front side of the wheelchair. The hand holding member may also contain various configurations to facilitate the ergonomic use of the wheelchair attachment apparatus.

In a preferred embodiment, the wheelchair contains a front frame member that spans the two front vertical frame members. The frame member may consist of various configurations, including a single horizontal bar member, a double horizontal bar member, two bar members that criss-cross. The front frame member may be configured to fold when the wheelchair is folded, such as a scissors-type mechanism for the criss-cross configuration. The front frame member preferably contains two receiving members where the ends of the connecting arm members can be inserted and attached to the frame of the wheelchair. Once attached to the front frame member, the hand hold member and connecting arm members can be used to lift or otherwise maneuver the occupied wheelchair.

Accordingly, there has been provided a wheelchair attachment apparatus, a permanent wheelchair apparatus, and associated method for lifting or otherwise maneuvering a wheelchair. The wheelchair attachment apparatus is capable of being attached to a wheelchair for use, detached from the wheelchair, and alternatively stored on the wheelchair when not used. The attachment apparatus is also capable of being used simultaneously with wheelchair attachments, such as foot/leg supports. The permanent wheelchair apparatus is capable of operably receiving a lifting mechanism that can be attached, detached, and alternatively stored on the wheelchair when not used. Other attributes and benefits of the foregoing will be apparent to one of ordinary skill in the art from the following drawings and detailed description.

BRIEF DESCRIPTION OF THE DRAWINGS

The invention may be more completely understood in consideration of the following detailed description of various embodiments of the invention in connection with the accompanying drawings, in which.

Figure 1:
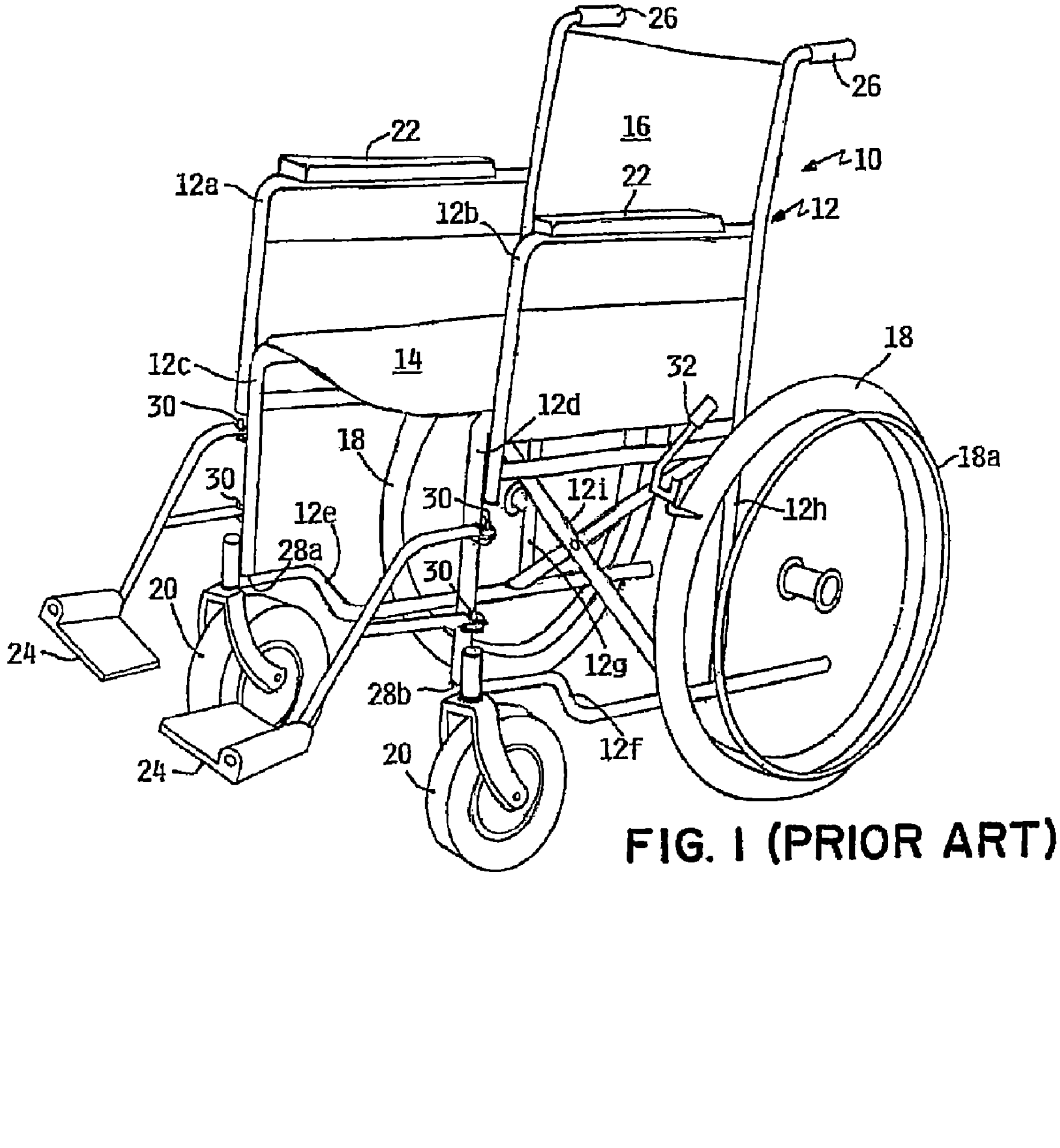
FIG. 1 (PRIOR ART)
FIG. 1 is a perspective view of a conventional wheelchair prior to the present invention being operably attached thereto.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring now to the several Figures wherein like numerals indicate like parts. A conventional wheelchair 10 is illustrated in FIG. 1, which generally comprises a frame 12, a seat 14 and back-support 16 connected to the frame 12, two large rear wheels 18 connected to the frame 12 for directly supporting the weight of the wheelchair occupant, a pair of small front wheels 20 swivelably mounted to the frame 12, arm support structures 22, foot/leg support structures 24, and a pair of spaced apart handgrips 26 connected to the upper rear part of the frame 12 for being grasped by an attendant to thereby enable the attendant to push and guide the wheelchair from the rear. The two large rear wheels 18 may also contain an outer ring 18*a*, which may be grasped and rotated by the wheelchair occupant to move the wheelchair carrying the occupant. Each of the leg support structures 24 may be permanently attached to the front frame members 12*c*, 12*d*, or alternatively, the leg support structures 24 may be operably attachable and removable from the front frame members 12*c*, 12*d* by leg attachment means 30, such as pins that are attached to the front frame members 12*c*, 12*d*, foot rest or leg rest attachment brackets, or other attachment means currently used with conventional wheelchairs 10. The wheelchair 10 may also contain one or more hand-breaks 32 proximate the two large rear wheels 18 for locking the wheelchair 10 in a stationary position.

The frame can take various forms, but typically provides a pair of tubular side frames 12*a*, 12*b* that are cross-connected in some manner such as illustrated in FIG. 1. In foldable wheelchairs, wherein the seat 14 and back-rest 16 are provided in material that may be folded such as canvas or other cloth-like material, the cross-connection between the side frames 12*a*, 12*b* is some scissor-mechanism 12*i* that allows the wheelchair 10 to be opened in an extended position or closed in a folded position. In some form or another, the wheelchair 10 is configured such that the side frames 12*a*, 12*b* will incorporate some structure that defines the forward, generally vertical corners of the wheelchair, such as front frame members 12*c*, 12*d* that run in a generally vertical direction between each of the arm support structures 22 and ending proximate each of the small front wheels 20. The end of the front vertical frame 12*a*, 12*b* proximate the small front wheels 20 contains a tubular aperture 28*a*, 28*b* on each lower front side of the wheelchair 10. The frame may also contain a lower horizontal frame portion 12*e*, 12*f* that extends between the end of the front frame members 12*c*, 12*d* proximate the tubular apertures 28*a*, 28*b* and the vertical wheel support frame 12*g*, 12*h* proximate the two large rear wheels 18. Because of the general configuration of a conventional wheelchair 10, one or more attendants will have difficulty in lifting and maneuvering an occupied wheelchair to go up and/or down a flight of stairs. This difficulty increases when the wheelchair occupant is of any substantial size, the attendant is not physically strong compared to the weight of the occupied wheelchair, the flight of stairs is relatively steep, or the like. If the attendant were to attempt to lift an occupied wheelchair up a flight of stairs, the attendant would most likely tilt the occupied wheelchair backwards lifting the front wheels 20 off of the ground, and walk backwards up the stairs while simultaneously pulling up on the handgrips 26 to lift the larger rear wheels 18 up each individual stair. In most instances, the attendant would be assisted by one or more attendants that would grasp and lift the wheelchair by either the lower horizontal frame portion 12*e*, 12*f*, the leg support structures 24, the swivel wheels 20, or the like. The attendant maintaining the handgrips 26 may alternatively walk frontwards up the stairs while one or more assistants grasp a front portion of the wheelchair and walk backwards up the flight of stairs. In going down a flight of stairs, the same type of technique may be utilized, except the occupied wheelchair would be assisted down the flight of stairs by the one or more attendants. In any event, the assisting attendant on the front side of the wheelchair is not able to grab any meaningful structural member that is intended to help the attendant lift or otherwise maneuver the wheelchair.

In a preferred embodiment, the wheelchair attachment apparatus of the present invention is designed to detachably mount to the wheelchair structure that defines the wheelchair's front lower corners, such as members 28*a*, 28*b* and 12*c*, 12*d*. The detachably mounted attachment apparatus of the present invention allows a single attendant to easily grasp and control the front side of an occupied wheelchair while one or more attendants use the handgrips 26 to traverse a flight of stairs.

Figure 2A:
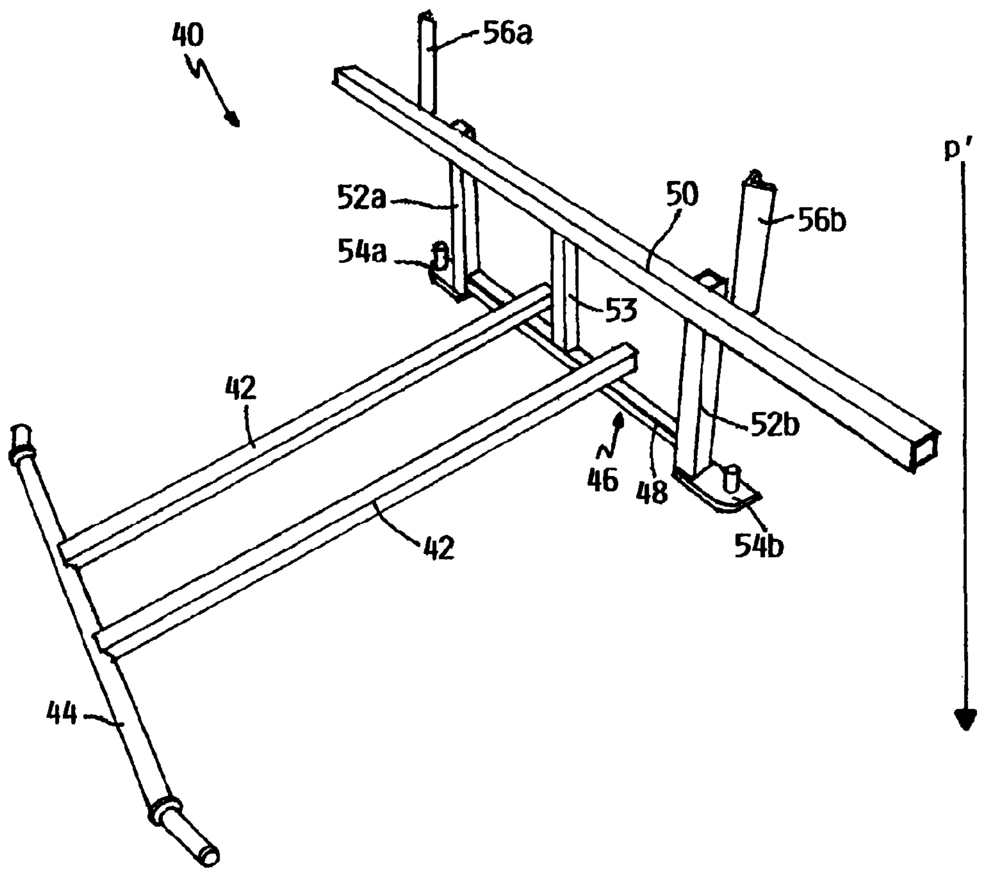
FIG. 2A is a perspective view of a wheelchair lifting attachment apparatus in accordance with the teachings of the present invention.
Figure 2B:
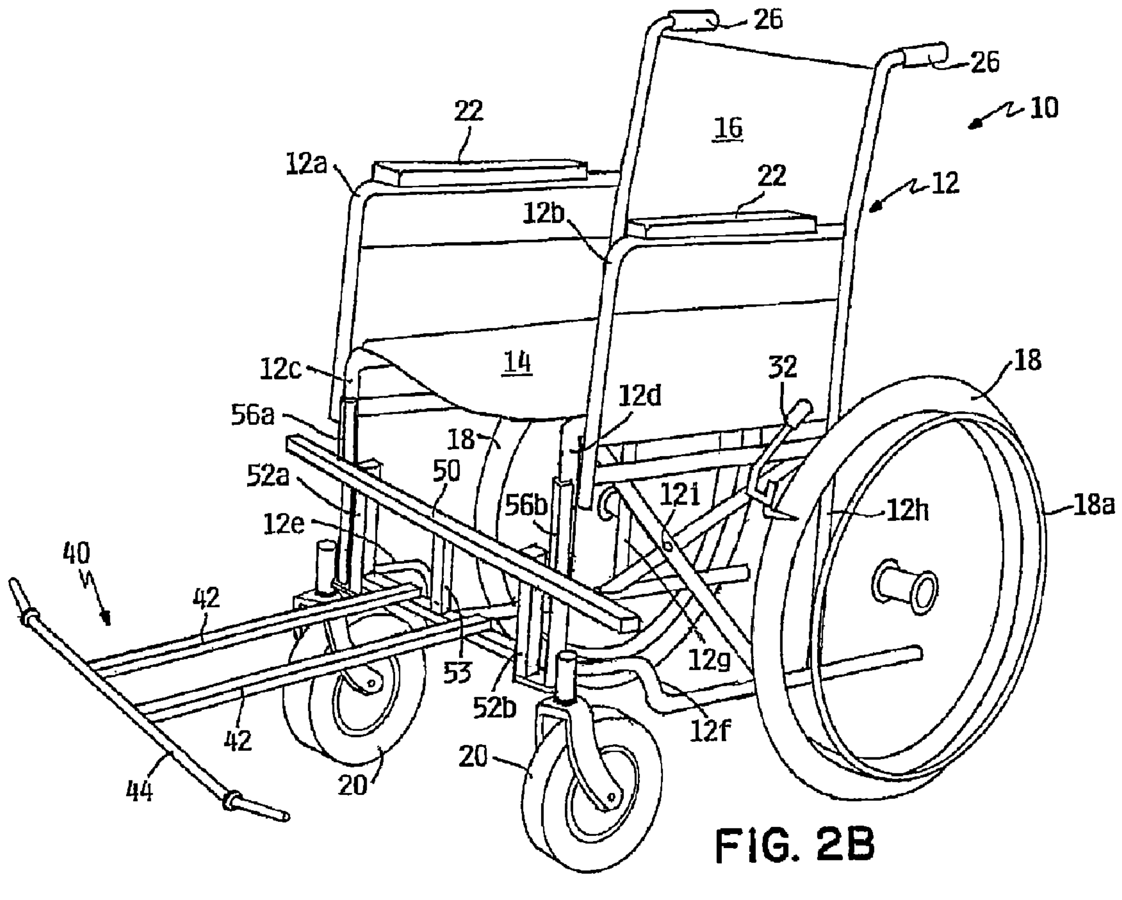
FIG. 2B is a perspective view of the wheelchair lifting attachment apparatus of FIG. 2A shown in the operative mode operably attached to a conventional wheelchair.

Referring now to the embodiment shown in FIGS. 2A-2B, the wheelchair lift attachment apparatus 40 of the present invention comprises a pair of connecting arm members 42 located between a lifting or handhold member 44 and a wheelchair connection portion 46. The wheelchair connection portion 46 comprises a lower horizontal member 48 spaced apart from an upper horizontal member 50 connected by two outer vertical support members 52*a*, 52*b*. The wheelchair connection portion 46 of the present embodiment also contains a centrally located vertical support member 53 that connects the lower horizontal member 48 and the upper horizontal member 50 and is vertically spaced from the vertical support members 52*a*, 52*b*. In other preferred embodiments, the wheelchair connection portion 46 may contain more than one vertical support member 53, or alternatively, the wheelchair connection portion may not contain a vertical support member 53. In the embodiment shown in FIGS. 2A-2B, connected to the vertical support members 52*a*, 52*b* and located at an end of the vertical support members 52*a*, 52*b* opposite the connection of the vertical support members 52*a*, 52*b* to the lower horizontal member 48 are two extending members with vertical plugs 54*a*, 54*b* that operably engage the tubular apertures 28*a*, 28*b* of a conventional wheelchair 10. Extending from the upper horizontal member 50 are two vertical frame engaging members 56*a*, 56*b*. As shown in FIG. 2A, the lower horizontal member 48 and upper horizontal member 50 are preferably arranged in a parallel configuration with each other. FIG. 2A also illustrates the vertical support members 52a, 52b, the centrally located vertical support member 53, the lower horizontal member 48, the plugs 54a, 54b, and the vertical frame engaging members 56a, 56b are arranged in the same vertical plane (P'). In an alternative preferred embodiment, the upper horizontal member 50 is also attached to the vertical support members 52a, 52b in such a configuration to also be in vertical plane (P'). In this alternative preferred embodiment, the two vertical frame engaging members 56a, 56b would extend from the top portion of the upper horizontal member 50, rather than the inside portion, to enable the two vertical frame engaging members 56a, 56b to be in vertical plane (P').

As illustrated in FIG. 2B, the two vertical frame engaging members 56a, 56b are spaced apart a distance such that they engage the front frame members 12c, 12d, respectively, when the wheelchair lift attachment apparatus 40 is detachably mounted to the wheelchair 10. Also as illustrated in FIG. 2B, the vertical plugs 54a, 54b insert into and operably engage the tubular apertures 28a, 28b of the conventional wheelchair 10. The pair of connecting arm members 42, lifting member 44, and the wheelchair connection portion 46 are also configured such that the pair of connecting arm members 42 are located at an angle that is preferably between 0° and 40° relative to the ground, and optimally between 10° and 30°, with other subranges of the foregoing ranges contemplated and considered part of the foregoing disclosure. As illustrated by the manual wheelchair lift attachment 40 being detachably mounted to the wheelchair 10 in FIG. 2B, the distance between the vertical frame engaging members 56a, 56b is the same as the distance between the plugs 54a, 54b as a result of the parallel, vertical relationship between the front frame members 12c, 12d and the resulting tubular apertures 28a, 28b at the end of the front frame members 12c, 12d. The front frame members 12c, 12d are dependent upon the size of the wheelchair 10, which typically range from 14 inches to 30 inches in width. As illustrated in FIG. 2B, the vertical support members 52a, 52b are spaced apart on the lower horizontal member 48 a distance less than the distance between the vertical frame engaging members 56a, 56b and also the plugs 54a, 54b. The upper horizontal member 50 is preferably longer in length than the distance between the front frame members 12c, 12d, which ranges from 14 inches to 30 inches on standard wheelchairs. As such, different sized wheelchair attachments 40 are contemplated by the present invention.

In a preferred embodiment, the vertical frame engaging members 56a, 56b extend a distance between ½ inch to about 5 inches, and more optimally between 1 and 3 inches with other subranges of the foregoing ranges contemplated, away from the upper horizontal member 50 in an upward direction. As illustrated in FIG. 2B, the vertical frame engaging members 56a, 56b have a concave engaging region that operably engages with the tubular nature of the respective front frame members 12c, 12d. In order to provide the concave engaging region of the vertical frame engaging members 56a, 56b, the vertical frame engaging members 56a, 56b may be angled, arcuate or otherwise shaped to operably engage with the front frame members 12c, 12d.

In a preferred embodiment, the plugs 54a, 54b extend a distance between ½ inch to about 3 inches into the tubular apertures 28a, 28b, and optimally about 1 inch to about 2 inches. Other subranges of the foregoing ranges are contemplated in the present invention. The plugs 54a, 54b also preferably have a diameter such that the plugs 54a, 54b slide into the tubular apertures 28a, 28b. Preferably, the plugs 54a, 54b fit easily, but yet snuggly, within the tubular apertures 28a, 28b to operably engage with the wheelchair 10.

In a preferred embodiment, the upper horizontal member 50 extends a distance at least as wide as the width of the front frame members 12c, 12d, and preferably a ½ inch up to about 5 inches wider than the width of the front frame members 12c, 12d, and optimally a ½ inch to about 2 inches wider than the width of the front frame members 12c, 12d, such that the upper horizontal member 50 also operably engages with the front frame members 12c, 12d when the manual wheelchair lift attachment 40 is detachably mounted to the wheelchair 10.

In a preferred embodiment, the connecting arm members 42 extend the lifting member 44 away from the wheelchair connection portion 46 a distance between six inches and four or more feet, and more optimally between about 1 foot and about 3 feet. In one embodiment, the lifting member 44 may be wider than the width of the wheelchair, and in an alternative embodiment, the lifting member 44 is significantly narrower than the width of the wheelchair. As such, it is contemplated that the lifting member 44 of the present may have a width that ranges from six inches to three feet, optimally 1 foot to 3 feet, and more optimally about 2 feet. As illustrated in FIG. 7, the lifting member 44 may also have various configurations, and may optionally include hand grips 58.

Figure 3A:
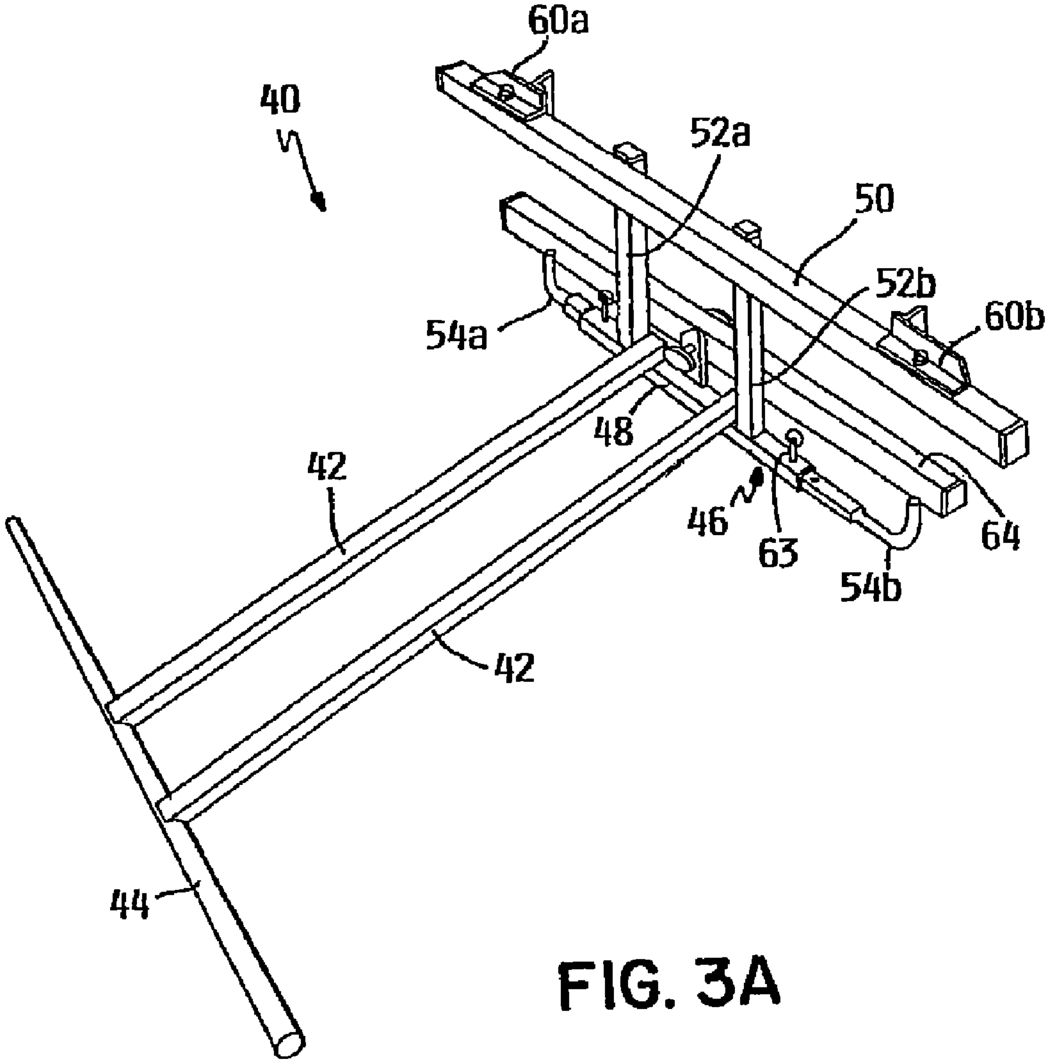
FIG. 3A is a perspective view of another embodiment of the wheelchair lifting attachment apparatus in accordance with the teachings of the present invention.
Figure 3B:
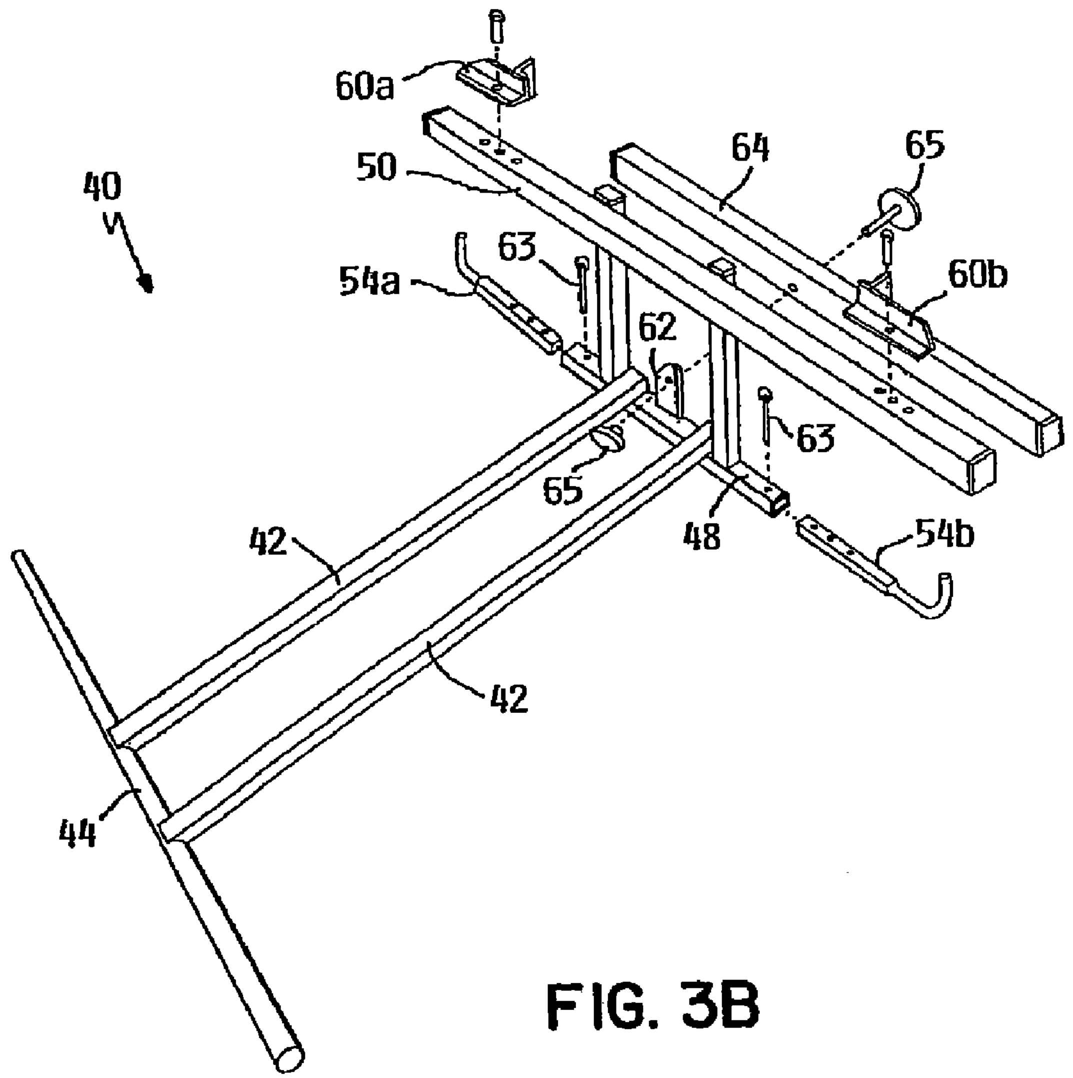
FIG. 3B is an exploded perspective view of the wheelchair lifting attachment apparatus embodiment of FIG. 3A.
Figure 3C:
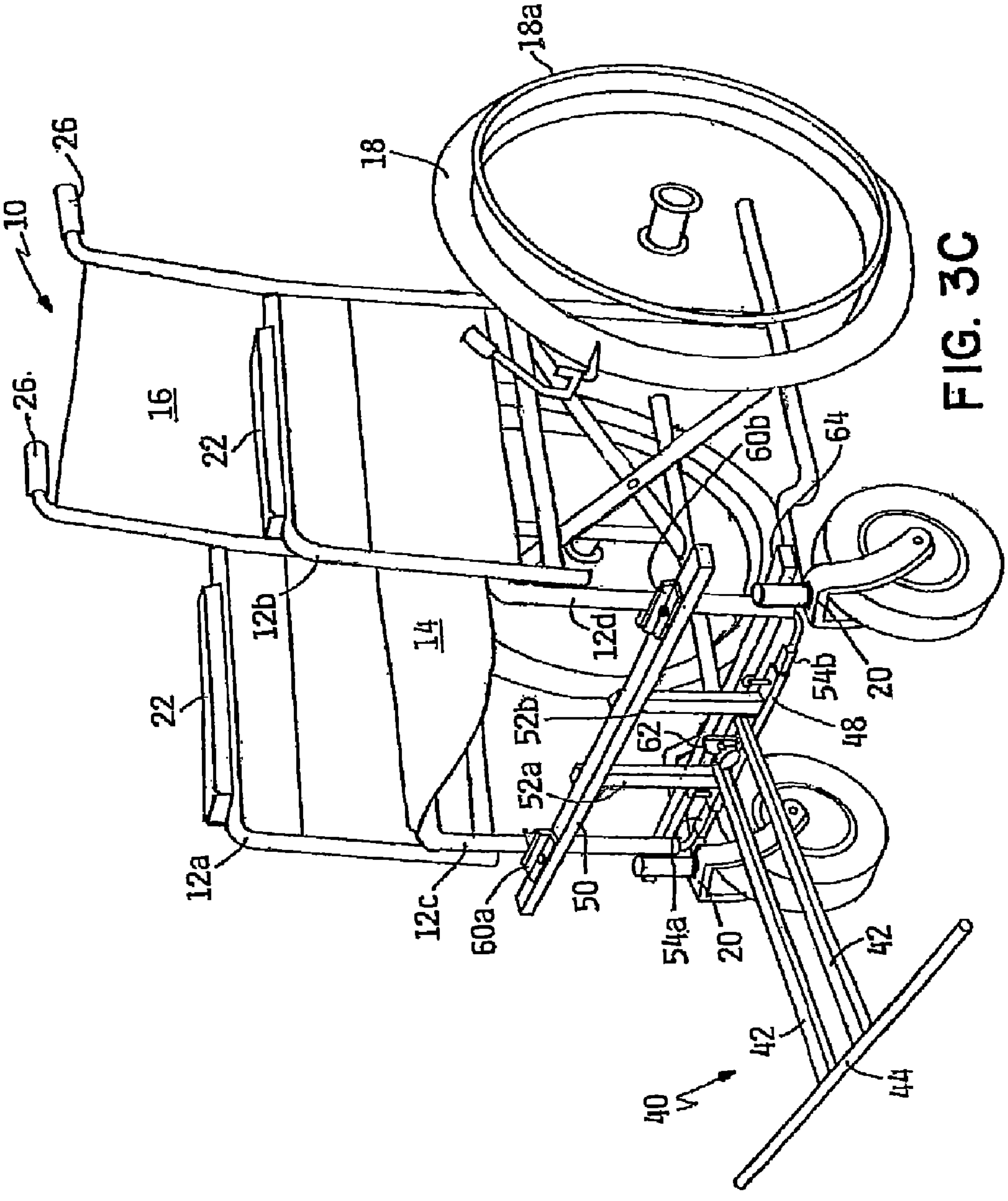
FIG. 3C is a perspective view of the wheelchair lifting attachment apparatus of FIG. 3A shown in the operative mode operably attached to a conventional wheelchair.

The detachably mounted attachment apparatus of the present invention allows a single attendant to easily grasp and control the front side of an occupied wheelchair while another attendant uses the handgrips 26 of the wheelchair 10 to traverse a flight of stairs. To attach the wheelchair lift attachment apparatus 40 to a wheelchair, the wheelchair lift attachment apparatus 40 is maneuvered such that the plugs 54a, 54b are inserted into the tubular apertures 28a, 28b, and the upper horizontal member 50 and the vertical frame engaging members 56a, 56b engage the front frame members 12c, 12d of the wheelchair 10. For insertion of the plugs 54a, 54b into the respective tubular apertures 28a, 28b, the small front wheels 20 may need to be swiveled to fully expose the tubular apertures 28a, 28b. Once the wheelchair lift attachment apparatus 40 is detachably mounted, the attendant uses the lifting member 44 to lift and/or maneuver the front side of the occupied wheelchair while another attendant uses the handgrips 26 to lift and/or maneuver the back side of the occupied wheelchair. Either the attendant using the handgrips 26 or the attendant with the lifting member 44 may traverse up or down the stairs first, although preferably the attendant with the lifting member 44 is located on the downside of the stairs. Referring now to FIGS. 3A-3C, another preferred embodiment of the present invention is illustrated. The wheelchair lift attachment apparatus 40 of the present invention comprises a pair of connecting arm members 42 located between a lifting or hand hold member 44 and a wheelchair connection portion 46. In this preferred embodiment, the lifting handhold member is illustrated as being straight, although other acceptable configurations may used with this preferred embodiments, such as those configurations illustrated in FIGS. 7A-7G. The wheelchair connection portion 46 comprises a lower horizontal member 48 spaced apart from an upper horizontal member 50 connected by two outer vertical support members 52a, 52b. Located outside the vertical support members 52a, 52b and proximately connected to the lower horizontal member 48 are two extending members with vertical plugs 54a, 54b that operably engage the tubular apertures 28a, 28b of a conventional wheelchair 10. In this preferred embodiment, both of the extending members with vertically extending plugs 54a, 54b are slidably adjustable with respect to the lower horizontal member 48 to accommodate different sized wheelchairs. Once the desired width of the vertically extending plugs 54a, 54b with respect to the lower horizontal member 48 are determined, a locking means such as one or more pins 63 is inserted through the corresponding apertures on the lower horizontal member 48 and the extending members with vertically extending plugs 54*a*, 54*b*. One of ordinary skill in the art will appreciate that other locking means, for example screws, bolts and spring-biased plugs or the like, are contemplated and are within the scope of the present invention.

The upper horizontal member 50 also contains bench members 60*a*, 60*b*, which in this preferred embodiment are operably attached and adjustable. In another preferred embodiment, the bench members 60*a*, 60*b* are permanently attached to the upper horizontal member 50. The adjustable bench members 60*a*, 60*b* in this preferred embodiment illustrated in FIGS. 3A-3C, may be operably fastened to the upper horizontal member 50 by fastening means, such as a pin or other acceptable fastening means as previously discussed and known to one of ordinary skill in the art, that inserts through the corresponding apertures in the respective bench member 60*a*, 60*b* and the upper horizontal member 50. The bench members 60*a*, 60*b* which are generally "L" shaped such as to operably engage two sides of the front frame members 12*c*, 12*d* of the wheelchair 10 as illustrated in FIG. 3C, which prevents the wheelchair 10 from unintentionally collapsing into a folded state. In another preferred embodiment, the bench members 60*a*, 60*b* contain a different shape, such as "T" shaped, while still operably engaging two sides of the front frame members 12*c*, 12*d* of the wheelchair 10 when in use. Bench members that are adjustable allow the wheelchair lift attachment 40 to be used with different sized wheelchairs 10 without compromising the additional provided support. In an alternative preferred embodiment, the bench members 60*a*, 60*b* may contain two or more portions that extend towards the wheelchair 10 wherein such inwardly extending portions of bench members 60*a*, 60*b* are spaced at intervals of about an inch, or slightly wider than the front frame members 12*c*, 12*d*, to accommodate different sized wheelchairs. Such spaced intervals allow the same benches to be used on different sized wheelchairs without the need to adjust the bench members 60*a*, 60*b* with respect to the upper horizontal member 50, although such bench members with multiple inwardly extending portions may also be adjustable.

In the preferred embodiment illustrated in FIGS. 3A-3C, the front portion of the "L" shaped bench members 60*a*, 60*b*, which is in the same vertical plane as the upper horizontal member 50, preferably extends a distance between ½ inch to about 5 inches away from the upper horizontal member 50 in an upward direction, and more optimally between 1 and 3 inches with other subranges of the foregoing ranges contemplated. Additionally, the front portion of the "L" shaped bench members 60*a*, 60*b* are preferably about ½ inch to about 3 inches wide, and more optimally between 1 and 2 inches wide with other subranges of the foregoing ranges contemplated. The inner portion of the "L" shaped bench members 60*a*, 60, which is perpendicular to the upper horizontal member 50, preferably extends a distance between ½ inch to about 5 inches away from the upper horizontal member 50 in an upward direction, and more optimally between 1 and 3 inches with other subranges of the foregoing ranges contemplated. Additionally, the inner portion of the "L" shaped bench members 60*a*, 60, preferably extend s a distance between ½ inch to about 3 inches away from the upper horizontal member 50 in direction towards the backside of the wheelchair 10, and more optimally about 1 inch to about 2 inches with other subranges of the foregoing ranges contemplated. The front portion and the inner portion of the "L" shaped bench members 60*a*, 60*b* extending upward away from the upper horizontal member 50 are preferably the same dimensions, but in an alternative preferred embodiment are different sizes.

The wheelchair connection portion 46 of the preferred embodiment in FIGS. 3A-3C also contains a central attachment member 62 with a corresponding backing bar member 64 that operably connects thereto. The backing bar member 64 can be operably attached to the wheelchair lift attachment 40 by a fastening member 65 that fits through the apertures in the central attachment member 62 and the backing bar member 64, as illustrated in FIG. 3B. In a preferred embodiment, the backing bar member 64 is the same length as the upper horizontal member 50. Both the backing bar 64 and the upper horizontal member 50 are preferably equal in length or longer than the distance between the front frame members 12*c*, 12*d* of the wheelchair 10, which ranges from 14 inches to 30 inches on standard wheelchairs. In another alternative preferred embodiment, the backing bar member 64 and the upper horizontal member 50 are different lengths.

Figure 6A:
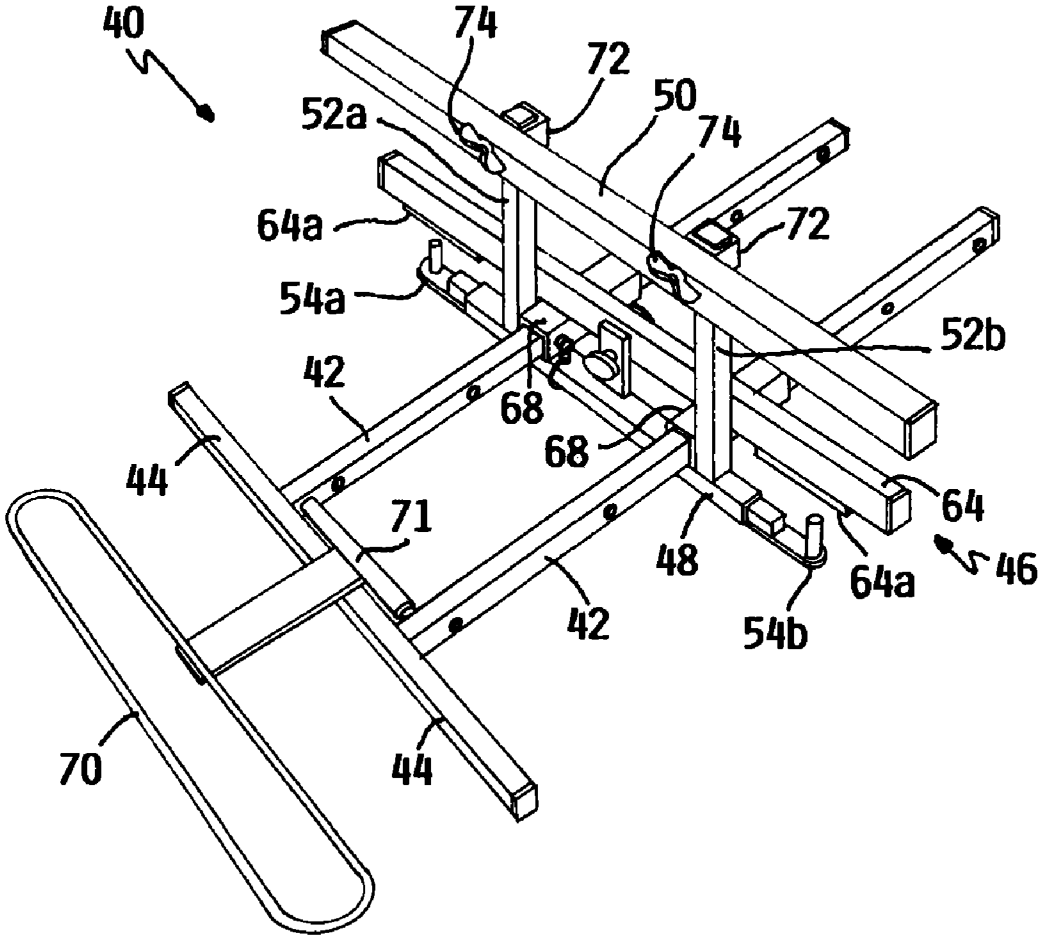
FIG. 6A is a perspective view of another embodiment of the wheelchair lifting attachment apparatus in accordance with the teachings of the present invention.

In a further alternative preferred embodiment, the backing bar member 64 is telescopically adjustable to expand or contract into different lengths. In one such preferred embodiment, both ends of the backing bar member 64 are adjustable such that both ends operably engage with a central portion, such as the adjustable extending plugs 54*a*, 54*b* and lower horizontal member 48 configuration shown in FIGS. 3A and 3B, except the adjustable ends of the backing bar member 64 may either include or not include the curved plug-type configuration. In another preferred embodiment, there are only two pieces that extend and are adjustable with respect to each other, such as the adjustable extending plugs 54*a*, 54*b* and lower horizontal member 48 configuration shown in FIGS. 6A-6B. When the ends of the backing bar member 64 include a curved plug-type configuration, the backing bar member 64 would be adjusted such that the plug-type configurations operably engage the outside edge of the front frame members 12*c*, 12*d* or the frame portion of the small swivel wheels 20 of the wheelchair 10 (not shown).

Referring now to the preferred embodiment illustrated in FIG. 3C, when the wheelchair lift attachment apparatus 40 is detachably mounted to the wheelchair 10, the backing bar member 64 provides additional support. Particularly, the backing bar member 64 is placed on the back side of the front frame members 12*c*, 12*d* such that when it is secured to the central attachment member 62 by fastening member 65, compression pressure is exerted both on the backside of the front frame members 12*c*, 12*d* of the wheelchair 10 by the backing bar member 64 and the front side by the upper horizontal member 50. The compression pressure that is exerted is a result of the front frame members 12*c*, 12*d* being sandwiched between the backing bar member 64 and at least the upper horizontal member 50 that engages with the front side of the front frame members 12*c*, 12*d*. In a preferred embodiment, the backing bar member 64 also rests on the top side of the lower horizontal frame portion 12*e*, 12*f* as shown in FIG. 3C to provide further support and safety measures. In an alternative embodiment not shown, the backing bar member 64 may provide even additional support by the use of a hooking member. In this alternative embodiment, the backing bar member 64 contains an aperture located at each end that allows preferably a straight threaded end of a hooking member to be inserted through and fastened to the backing bar member 64 while the hooking end of the hooking member operably engages and connects to the lower horizontal frame portion 12*e*, 12*f* of the wheelchair 10. Once the hooking end is operably engaged to the lower horizontal frame portion 12*e*, 12*f*, the threaded end is secured to the backing bar member 64 by fastening means to secure the backing bar member 64 to the lower horizontal frame portion 12*e*, 12*f*.

Figure 4A:
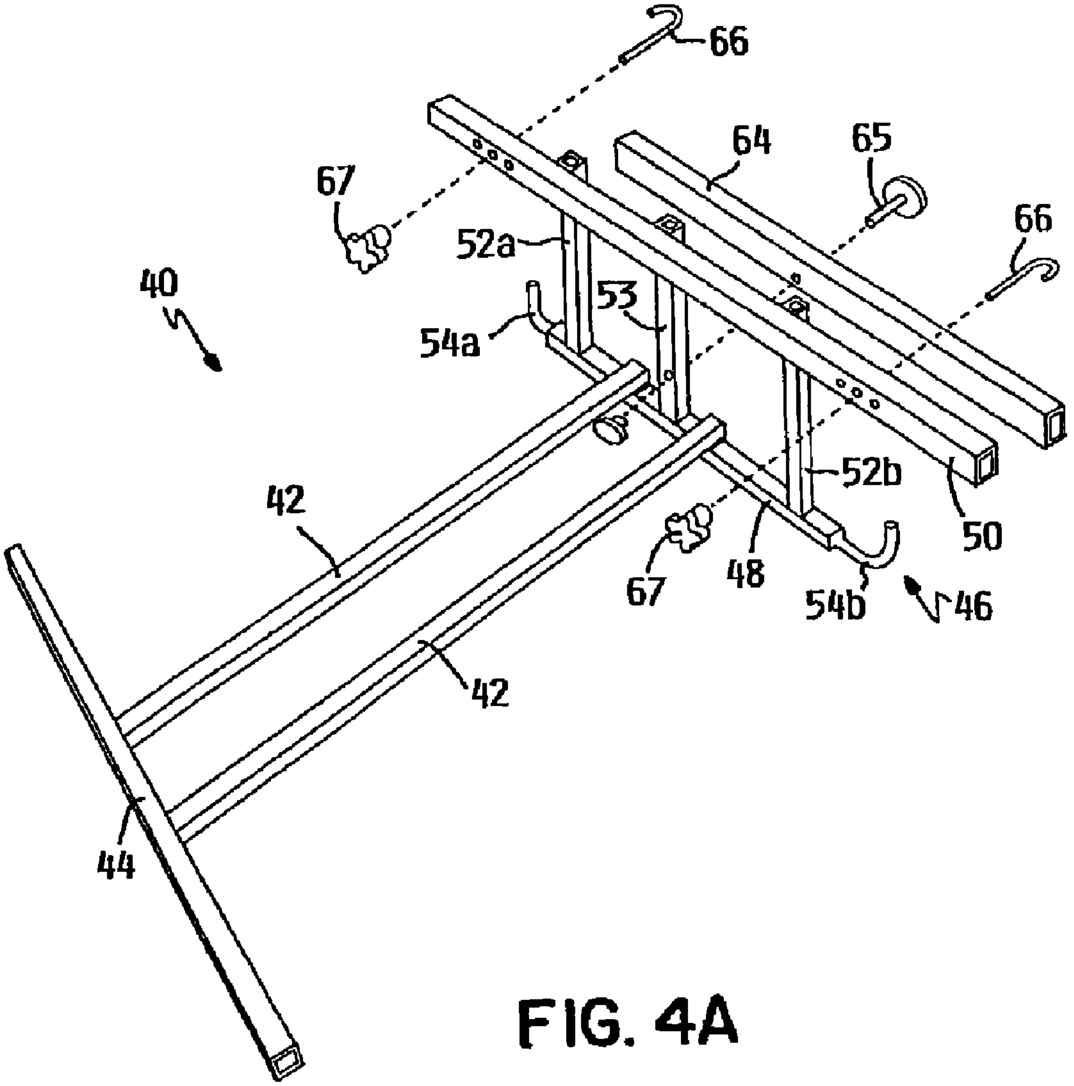
FIG. 4A is an exploded perspective view of another embodiment of the wheelchair lifting attachment apparatus in accordance with the teachings of the present invention.
Figure 4B:
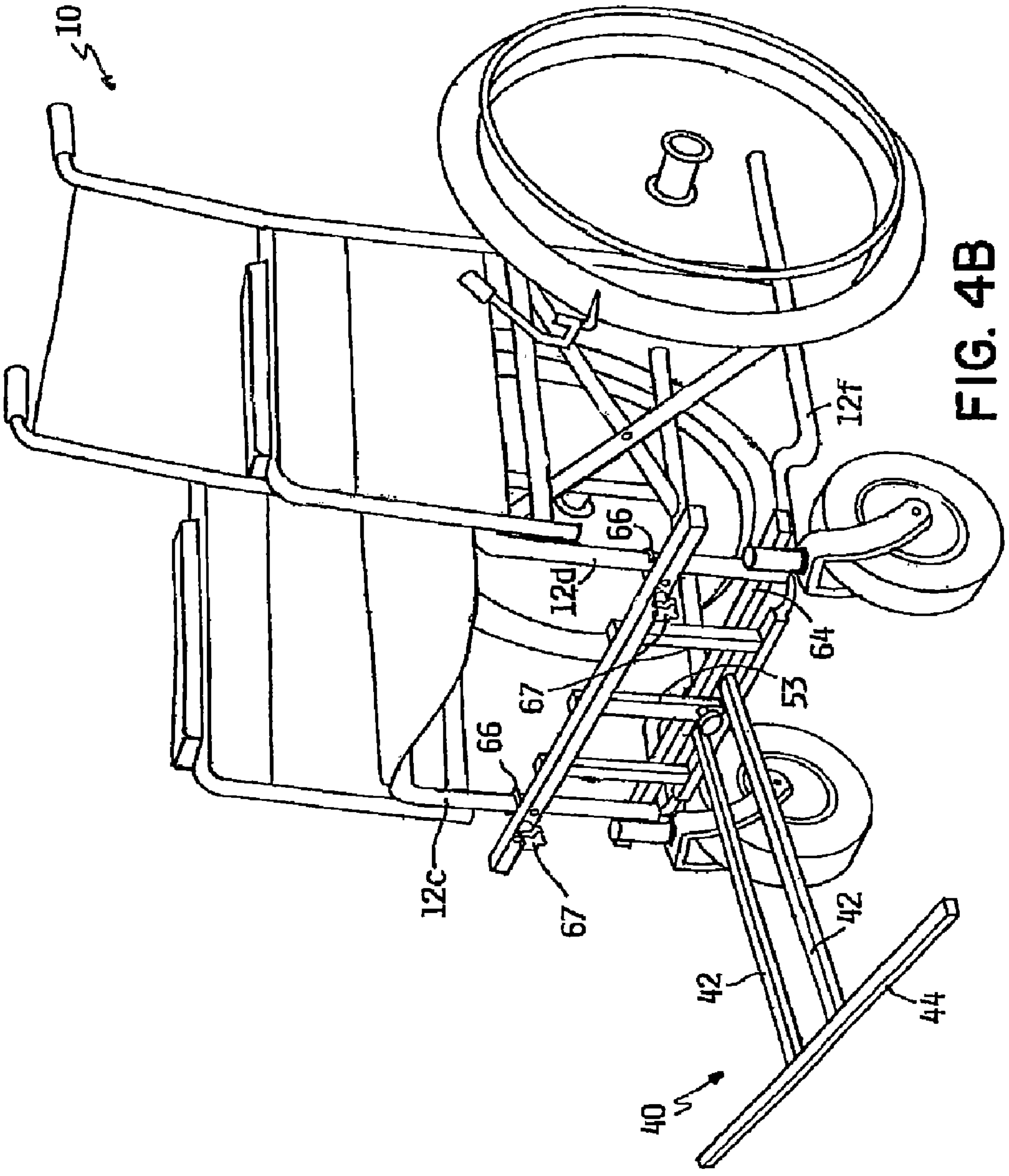
FIG. 4B is a perspective view of the wheelchair lifting attachment apparatus of FIG. 4A shown in the operative mode operably attached to a conventional wheelchair.

Referring now to FIGS. 4A-4B, another preferred embodiment of the present invention is illustrated. The wheelchair lift attachment apparatus 40 of the present invention comprises a pair of connecting arm members 42 located between a lifting or handhold member 44 and a wheelchair connection portion 46. Like the foregoing preferred embodiments, the wheelchair connection portion 46 comprises a lower horizontal member 48 spaced apart from an upper horizontal member 50 connected by two vertical support members 52*a*, 52*b* and a central located vertical support member 53. As illustrated in this preferred embodiment, it is contemplated that the lower horizontal member 48 and upper horizontal member 50 may be spaced apart by more than two vertical support members.

Figure 5A:
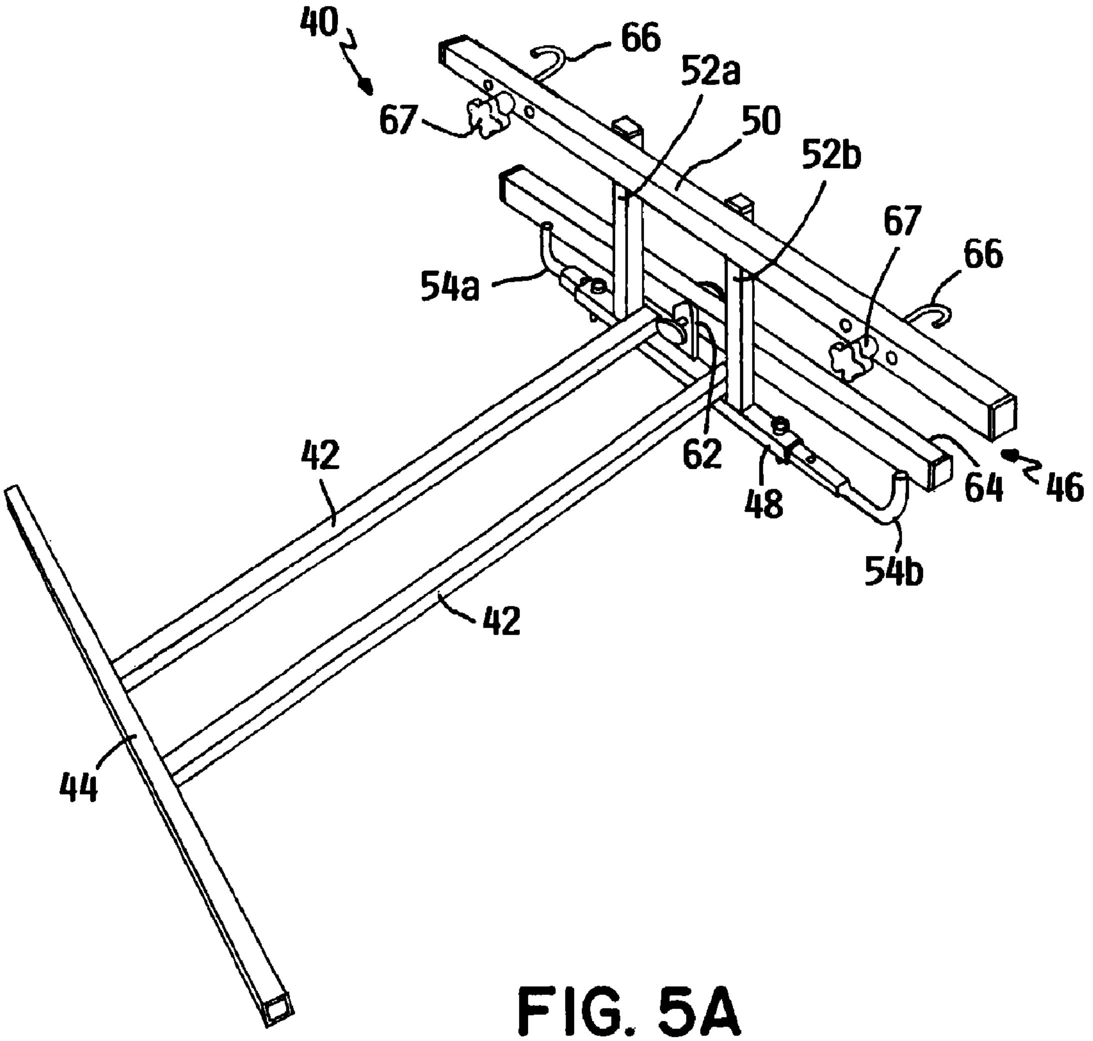
FIG. 5A is a perspective view of another embodiment of the wheelchair lifting attachment apparatus in accordance with the teachings of the present invention.
Figure 5B:
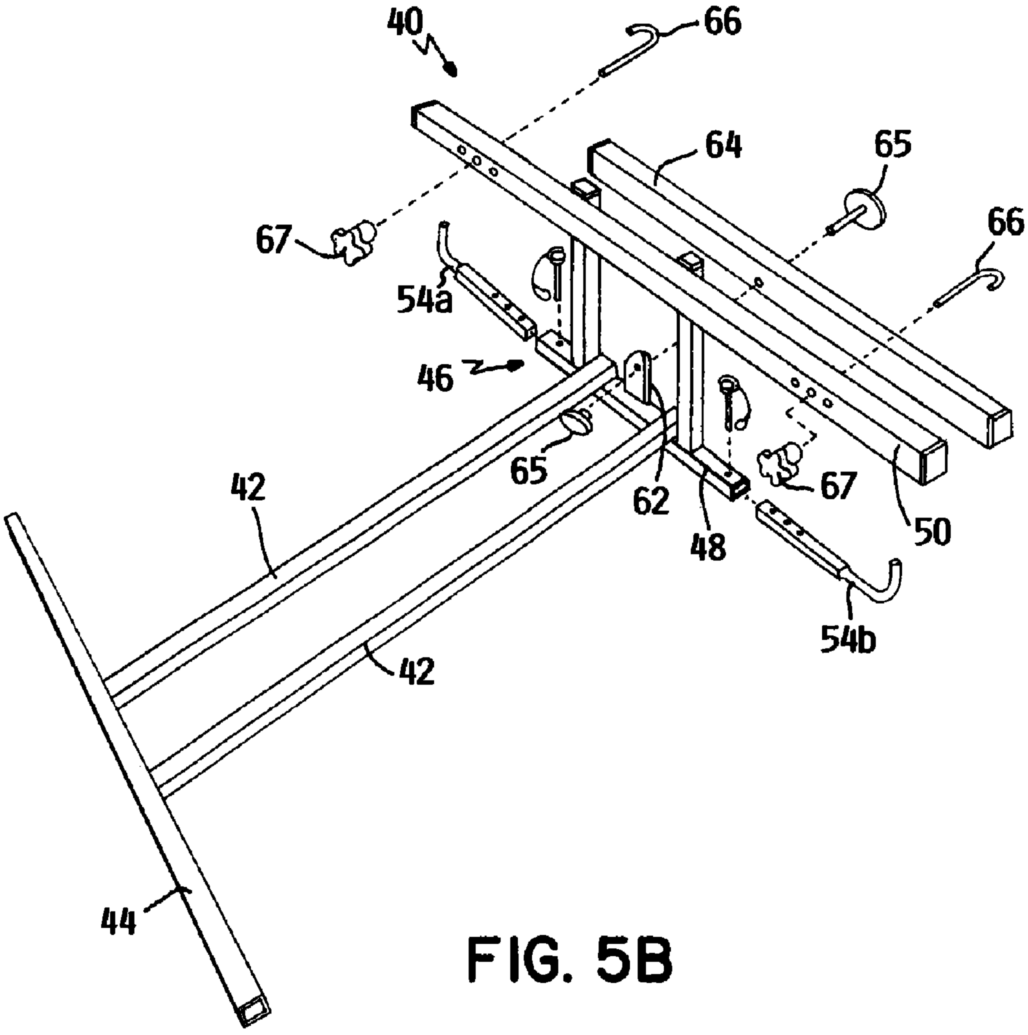
FIG. 5B is an exploded perspective view of the wheelchair lifting attachment apparatus embodiment of FIG. 5A.
Figure 5C:
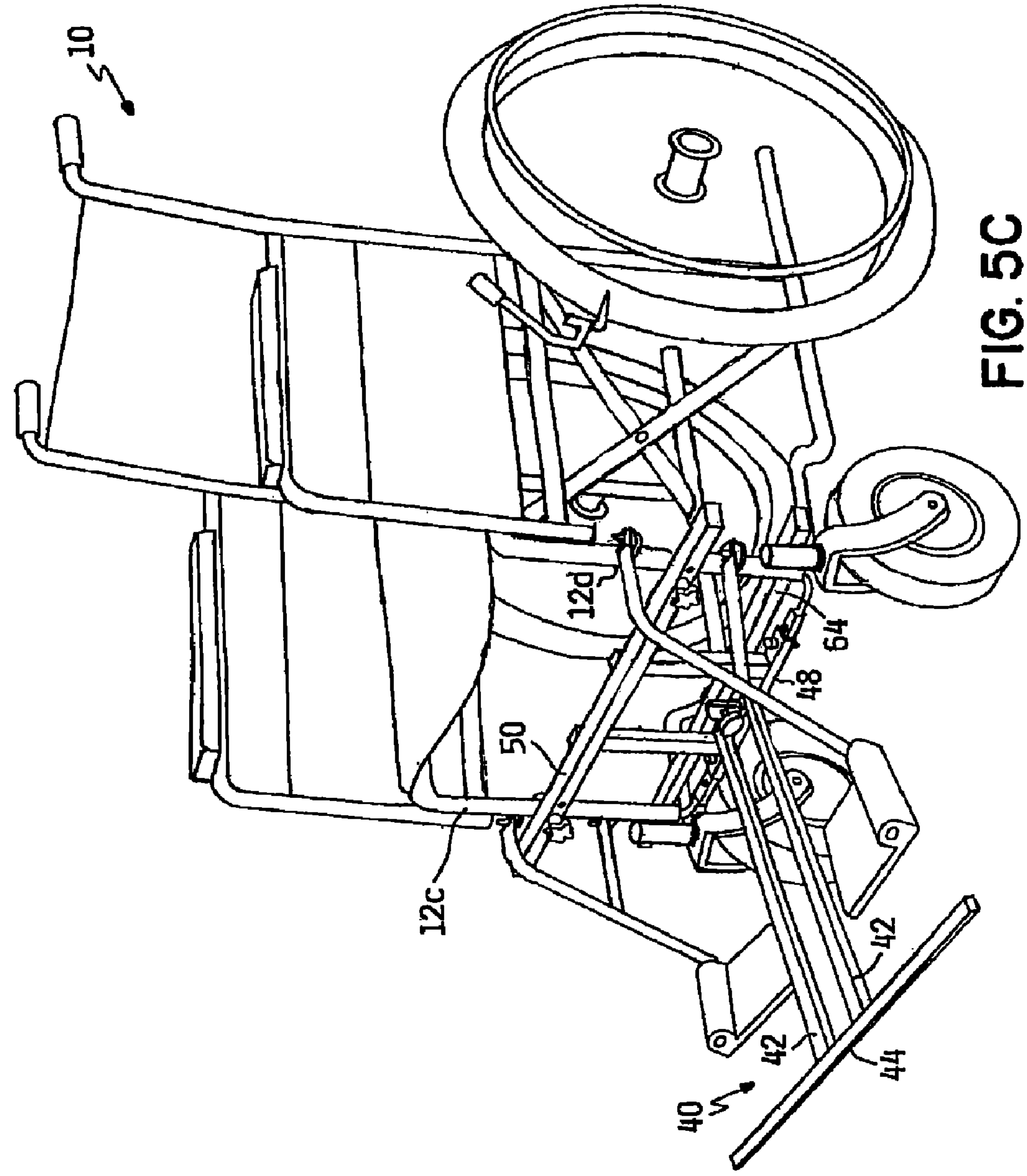
FIG. 5C is a perspective view of the wheelchair lifting attachment apparatus of FIG. 5A shown in the operative mode operably attached to a conventional wheelchair.

Located outside the vertical support members 52*a*, 52*b* and proximately connected to the lower horizontal member 48 are two extending members with vertically extending plugs 54*a*, 54*b* that operably engage the tubular apertures 28*a*, 28*b* of a conventional wheelchair 10. In this preferred embodiment, the wheelchair connection portion 46 also contains a backing bar member 64 that operably attaches to the vertical support member 53. In still another alternative preferred embodiment, the backing bar member 64 attaches to one or more vertical support members 52*a*, 52*b* that contain an aperture that corresponds with the fastening member 65, which could be in addition to or as an alternative to the backing bar member 64 operably attaching to a vertical support member 53 or central vertical support member 53. In each of these preferred embodiments, the backing member 64 provides additional support and security measures to the wheelchair lift attachment 40 by virtue of the exerted compression on both the front side and the back side of the front frame members 12*c*, 12*d* as previously discussed. Additionally, the backing bar member 64 may optionally contains hooking members that operably engage and connects to the lower horizontal frame portion 12*e*, 12*f* of the wheelchair 10 by compression pressure for additional support and security measures as previously discussed. In the preferred embodiment illustrated in FIGS. 4A and 4B, the upper horizontal member 50 also contains hooking members 66*a*, 66*b* which contain a hook configuration on the distal end and threads on the proximate end. In this preferred embodiment, the hook configuration on the distal end operably attaches to the front frame members 12*c*, 12*d* to provide additional support when the wheelchair lift attachment 40 is detachably mounted to the wheelchair 10, as shown in FIG. 4B. Preferably, the hooking members 66*a*, 66*b* maintain additional compression connection between the upper horizontal member 50 and the front frame members 12*c*, 12*d* by inserting the proximate threaded end through one of the apertures in the upper horizontal member 50 and fastening the hooking members 66*a*, 66*b* with fastening means, such as a threaded knob 67 as shown, or other fastenings such as a nut, wing-nut, or the like. The upper horizontal member 50 preferably contains multiple evenly spaced apertures for receiving the proximate threaded end of the hooking members 66*a*, 66*b*, which accommodates different sized wheelchairs. This preferred embodiment may also optionally contain one or more adjustable extending members with vertically extending plugs 54*a*, 54*b* with respect to the lower horizontal member 48 to accommodate different sized wheelchairs. Referring now to FIGS. 5A-5C, another preferred embodiment of the present invention is illustrated. The wheelchair lift attachment apparatus 40 of the present invention comprises a pair of connecting arm members 42 located between a lifting or handhold member 44 and a wheelchair connection portion 46. Like the foregoing preferred embodiments, the wheelchair connection portion 46 comprises a lower horizontal member 48 spaced apart from an upper horizontal member 50 connected by two outer vertical support members 52*a*, 52*b*. Located outside the vertical support members 52*a*, 52*b* and proximately connected to the lower horizontal member 48 are two extending members with vertical plugs 54*a*, 54*b* that operably engage the tubular apertures 28*a*, 28*b* of a conventional wheelchair 10. In this preferred embodiment, both of the extending members with vertically extending plugs 54*a*, 54*b* are slidably adjustable with respect to the lower horizontal member 48 to accommodate different sized wheelchairs. Once the desired width of the vertically extending plugs 54*a*, 54*b* and lower horizontal member 48 are determined, a locking means such as one or more pins 63 is inserted through the corresponding apertures on the lower horizontal member 48 and vertically extending plugs 54*a*, 54*b*. One of ordinary skill in the art will appreciate that other locking means, for example screws, bolts and spring-biased plugs or the like, are contemplated and are within the scope of the present invention. The wheelchair connection portion 46 also preferably contains a backing bar member 64 that operably attaches to a central attachment member 62 as previously discussed.

The upper horizontal member 50 also preferably contains optional hooking members 66*a*, 66*b*, which contain a hook configuration on the distal end and threads on the proximate end. In this preferred embodiment, the hook configuration on the distal end operably attaches to the front frame members 12*c*, 12*d* to provide additional support when the wheelchair lift attachment 40 is detachably mounted to the wheelchair 10, as shown in FIG. 4B. Preferably, the hooking members 66*a*, 66*b* maintain additional compression connection between the upper horizontal member 50 and the front frame members 12*c*, 12*d* by inserting the proximate threaded end through one of the apertures in the upper horizontal member 50 and fastening the hooking members 66*a*, 66*b* with fastening means, such as a threaded knob 67 as shown, or other fastenings such as a nut, wing-nut, or the like. The upper horizontal member 50 preferably contains multiple evenly spaced apertures for receiving the proximate threaded end of the hooking members 66*a*, 66*b*, which accommodates different sized wheelchairs.

As illustrated in FIG. 5C, the wheelchair lift attachment apparatus 40 may be detachably mounted to the wheelchair 10 such that when mounted to the wheelchair 10 the wheelchair lift attachment 40 can be used simultaneously with the use of detachable foot/leg support structures 24 without interfering therewith. In this preferred embodiment, the connecting arm members 42 fit within the space between the foot/leg support structures 24 and the lifting or handhold member 44 is far enough away from the foot/leg support structures 24 such that an attendant may use the wheelchair lift attachment apparatus 40 without interfering with the legs or feet of the occupant. In another preferred embodiment, the wheelchair lift attachment apparatus 40 may be used with wheelchairs that contain permanent foot/leg support structures without interfering therewith.

As illustrated in FIGS. 3A-3C and FIGS. 5A-5C, the connecting arm members 42 may be connected to both the lower horizontal member 48 and an inner location of the vertical support members 52*a*, 52*b*, as opposed to just the lower horizontal member 48 as illustrated in FIGS. 2A-2B. Connecting the connecting arm members 42 to the lower horizontal member 48 and a vertical support member 52*a*, 52*b* provides additional support and load capacity for the connecting arm members 42. In an alternative preferred embodiment, the connecting arm members 42 are connected to both the lower horizontal member 48 and an outer location of the vertical support members 52*a*, 52*b*. Preferably, the connecting arm members 42 connect to the top portion of the lower horizontal member 48, although the connecting arm members 42 could connect to the front side or bottom portion of the lower horizontal member 48. In still another alternative preferred embodiment, the connecting arm member 42 may connect to any portion of the upper horizontal member 50, the vertical support members 52*a*, 52*b*, the vertical support member 53, or a combination of one or more of the foregoing. In still another preferred alternative embodiment, the connecting arm members 42 are replaced with a single connecting arm member 42.

Figure 6B:
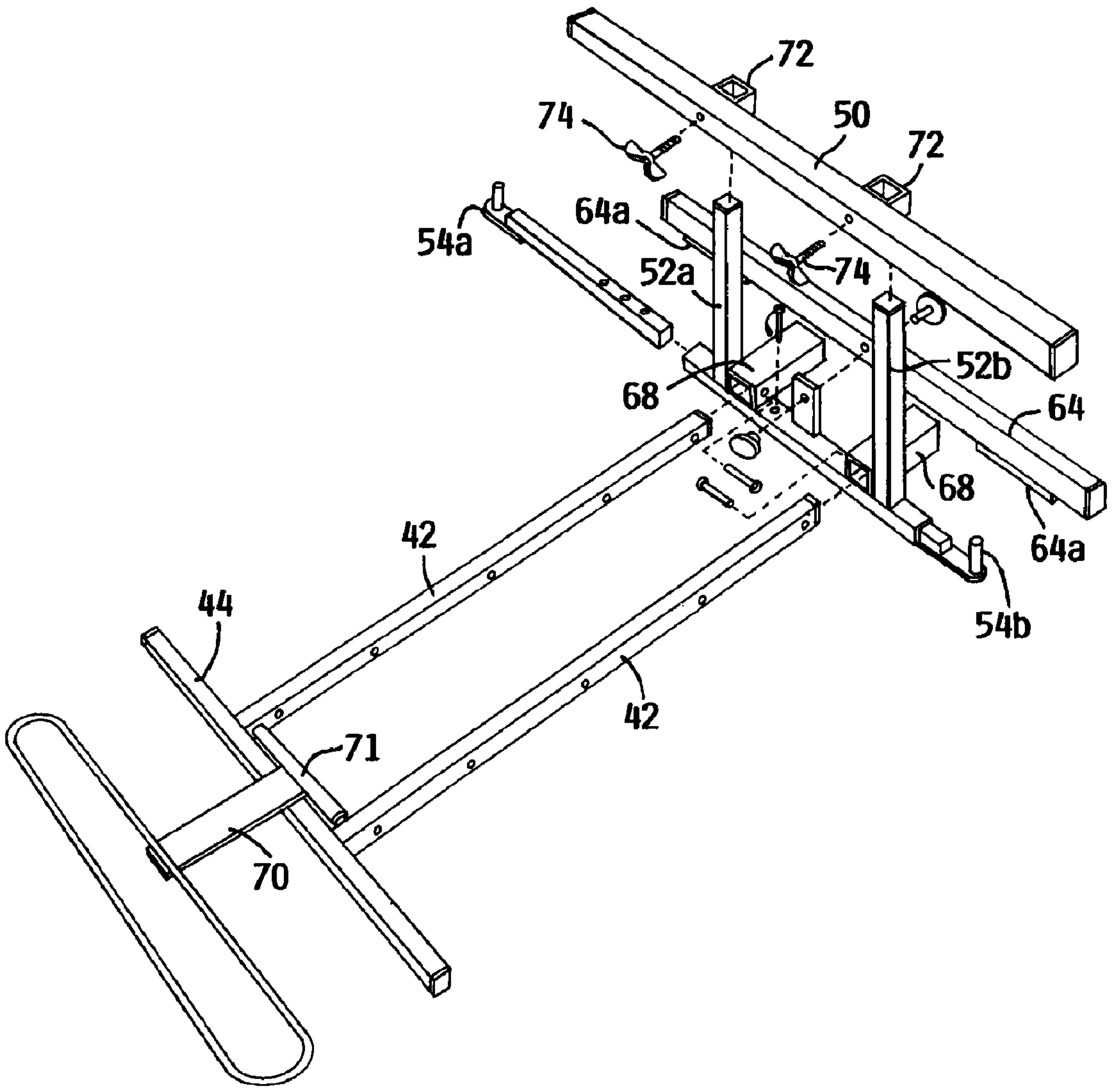
FIG. 6B is an exploded perspective view of the wheelchair lifting attachment apparatus embodiment of FIG. 6A.
Figure 6C:
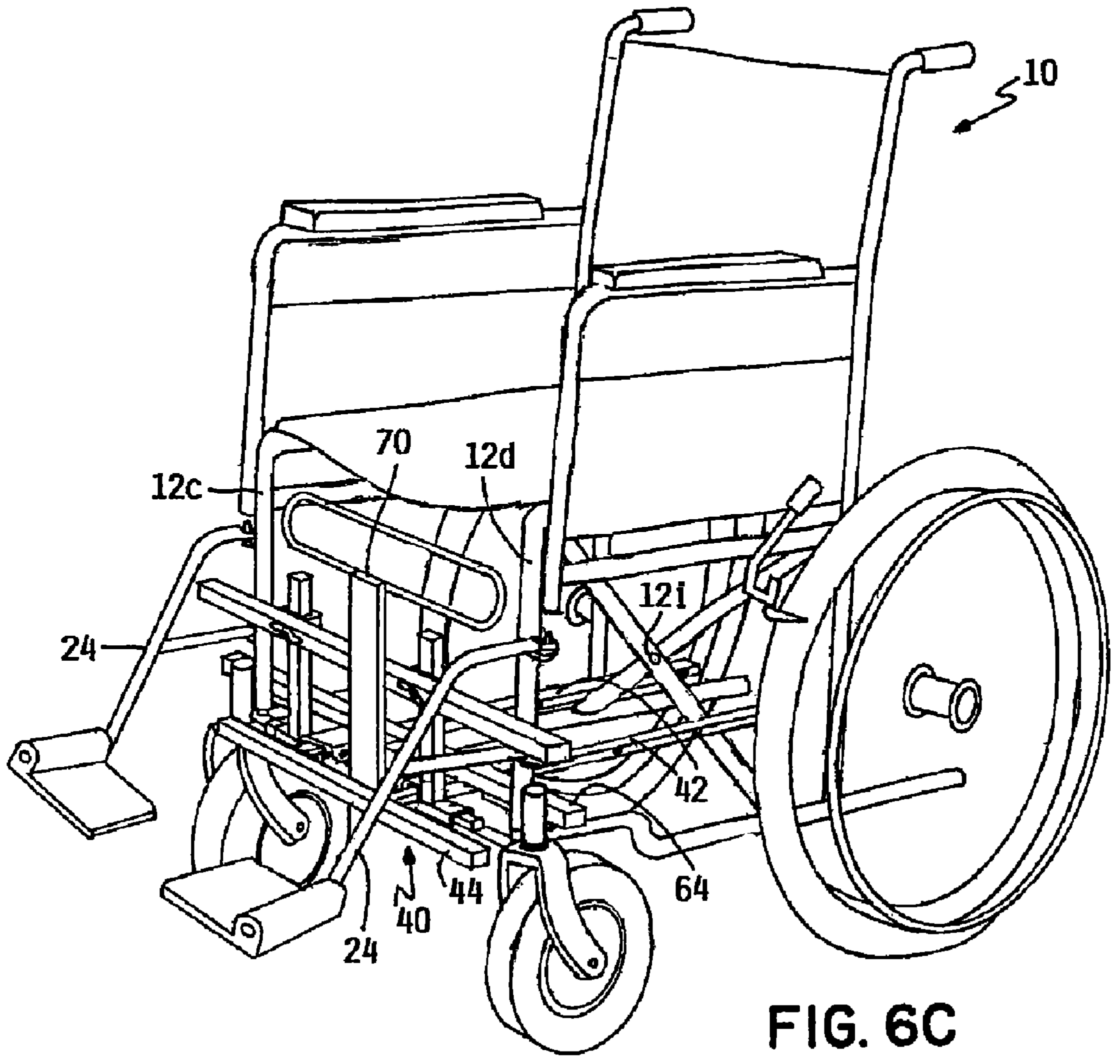
FIG. 6C is a perspective view of the wheelchair lifting attachment apparatus of FIG. 6A shown in a retracted operative mode operably attached to a conventional wheelchair.

Referring now to FIGS. 6A-6D, another preferred embodiment of the present invention is illustrated. The wheelchair lift attachment apparatus 40 of the present invention comprises a wheelchair connection portion 46 that is preferably detachably mounted to the wheelchair 10 independently from the connecting arm members 42 and lifting or handhold member 44. In this preferred embodiment, the connecting arm members 42 are connected to the handhold member 44 and are operably connectable and detachable to the wheelchair connection portion 46. Additionally, the connecting arm members 42 may adjustably slide into receiving members 68 located on the wheelchair connection portion 46 to allow the connecting arm members 42 to adjust to a retracted position as illustrated in FIG. 6C whereby at least a portion of the connecting arm members 42 may slide under the seat 14 of the wheelchair 10 proximate the scissor-mechanism 12*i* of the frame. The connecting arm members 42 may adjustably slide from the retracted position, FIG. 6C, to an extended operative position, FIG. 6D, or an intermediate position thereto. In either the retracted position or the extended position, the connecting arm members 42 may be locked in place by fastening means, such as a pin, nut and bolt, or the like. Alternatively, the connecting arm members 42 with the handhold member 44 may be disconnected from the receiving members 68 when not in an operational mode.

The receiving members 68 are preferably located on the top portion of the lower horizontal member 48 proximate the vertical support members 52*a*, 52*b*. The receiving members 68 may be located outside or inside the vertical support members 52*a*, 52*b*. In still another alternative preferred embodiment, the receiving members 68 may be located on any portion of the upper horizontal member 50, the vertical support members 52*a*, 52*b*, the vertical support member 53, or a combination of one or more of the foregoing. In still another preferred embodiment, one of ordinary skill in the art will appreciate that the connecting arm members 42 and lifting member 44 telescopically adjust between a retracted position and an extended position, or an intermediate position thereto, by telescoping means such as a telescoping handle used on luggage, which may be actuated by a push button, lever, or the like.

As illustrated in FIGS. 6A-6D, the connecting arm members 42 and lifting member 44 portion of the wheelchair lift attachment apparatus 40 may also have a foot support member 70. Preferably, the foot support member 70 adjusts between an extended position and a retracted position by a hinge-type mechanism 71. Alternatively, the foot support member 70 is in a fixed position relative to the lifting member 44 or the connecting arm members 42. The foot support 70 provides the occupant of the wheelchair with a position to place his/her feet both when the connecting arm members 42 are in the retracted position, extended position, or an intermediate position thereto.

The preferred embodiment illustrated in FIGS. 6A-6D also contains an adjustable upper horizontal member 50 relative to vertical support members 52*a*, 52*b*. In another alternative preferred embodiment, the adjustable upper horizontal member 50 adjusts relative to vertical support members 52*a*, 52*b*, the central vertical support member 53, or a combination thereof. The adjustable upper horizontal member 50 is preferably adjusted to the preferred location relative the vertical support members 52*a*, 52*b* and/or the vertical support member 53 by the receiving means 72. The vertical support members 52*a*, 52*b* and/or the vertical support member 53 are inserted within the receiving means 72 and a fastening member 74 fixes the upper horizontal member 50 in place once the preferred location of the upper horizontal member 50 is achieved. The fastening member 74 preferably comprises a threaded mechanism on the upper horizontal member 50 that receives a threaded fastener, such as a bolt or the like. The adjustable horizontal member 50 allows the wheelchair lift attachment 40 to be used with various wheelchairs to avoid other attachments, such as permanent or detachable foot/leg support structures. As illustrated in FIG. 6C, the upper horizontal member 50 is adjusted such that it rests on top of the lower attachment portion of the foot/leg support structures 24. In this configuration, the engagement of the upper horizontal member 50 with the foot/leg support structures 24 and the front frame members 12*c*, 12*d* provides two axis of support when used in combination with the backing bar member 64. The backing bar member 64 may contain additional frame contacting portions 64*a* to accommodate the location of the receiving members 68 without compromising the additional support provided by interaction with the lower horizontal frame portion 12*e*, 12*f*. The upper horizontal member 50 may also contain vertical frame engaging members 56*a*, 56*b*, bench members 60*a*, 60*b*, hooking members 66*a*, 66*b*, or a combination thereof.

In this preferred embodiment, only one of the extending members with vertically extending plugs 54*a*, 54*b* is slidably adjustable, which may be either extending member although illustrated in FIGS. 6B as being 54*a*. The single slidably adjustable extending member with vertical plug 54*a* (or 54*b*) accommodates different sized wheelchairs. Once the desired width of the extending members with vertically extending plugs 54*a*, 54*b* and lower horizontal member 48 are determined, a locking means such as a pin 63 is inserted through the corresponding aperture on the lower horizontal member 48 and the extending member with vertically extending plug 54*a* (or 54*b*). One of ordinary skill in the art will appreciate that other locking means, for example screws, bolts and spring-biased plugs or the like, are contemplated and are within the scope of the present invention. In an alternative preferred embodiment as previously discussed, both of the extending members with vertically extending plugs 54*a*, 54*b* are slidably adjustable.

The wheelchair connection portion 46 of the preferred embodiment also contains a central attachment member 62 with a corresponding backing bar member 64. The backing bar member 64 can be operably attached to the wheelchair lift attachment 40 by a fastening member 65 that fits through the apertures in the central attachment member 62 and the backing bar member 64. In a preferred embodiment, the backing bar member 64 is the same length as the upper horizontal member 50. Both the backing bar 64 and the upper horizontal member 50 are preferably equal in length or longer than the distance between the front frame members 12*c*, 12*d* of the wheelchair 10, which ranges from 14 inches to 30 inches on standard wheelchairs. In another alternative preferred embodiment, the backing bar member 64 and the upper horizontal member 50 are different lengths.

In a further alternative preferred embodiment, the backing bar member 64 and/or the upper horizontal bar 50 are telescopically adjustable to expand or contract into different lengths. In one such preferred embodiment, both ends of the backing bar member 64 and/or the upper horizontal bar 50 are adjustable such that both ends operably engage with a central portion, such as the adjustable extending plugs 54*a*, 54*b* and lower horizontal member 48 configuration shown in FIGS. 3A and 3B, except the adjustable ends of the backing bar member 64 and/or the upper horizontal bar 50 may either include or not include the curved plug-type configuration. In another preferred embodiment, there are only two pieces that extend and are adjustable with respect to each other, such as the adjustable extending plugs 54*a*, 54*b* and lower horizontal member 48 configuration shown in FIGS. 6A-6B. When the ends of the backing bar member 64 include a curved plug-type configuration, the backing bar member 64 would be adjusted such that the plug-type configurations operably engage the outside edge of the front frame members 12*c*, 12*d* or the frame portion of the small swivel wheels 20 of the wheelchair 10 (not shown). When the ends of the upper horizontal bar 50 include a curved plug-type configuration, the upper horizontal bar 50 would be adjusted such that the plug-type configurations operably engage the outside edge of the front frame members 12*c*, 12*d*.

Figure 6D:
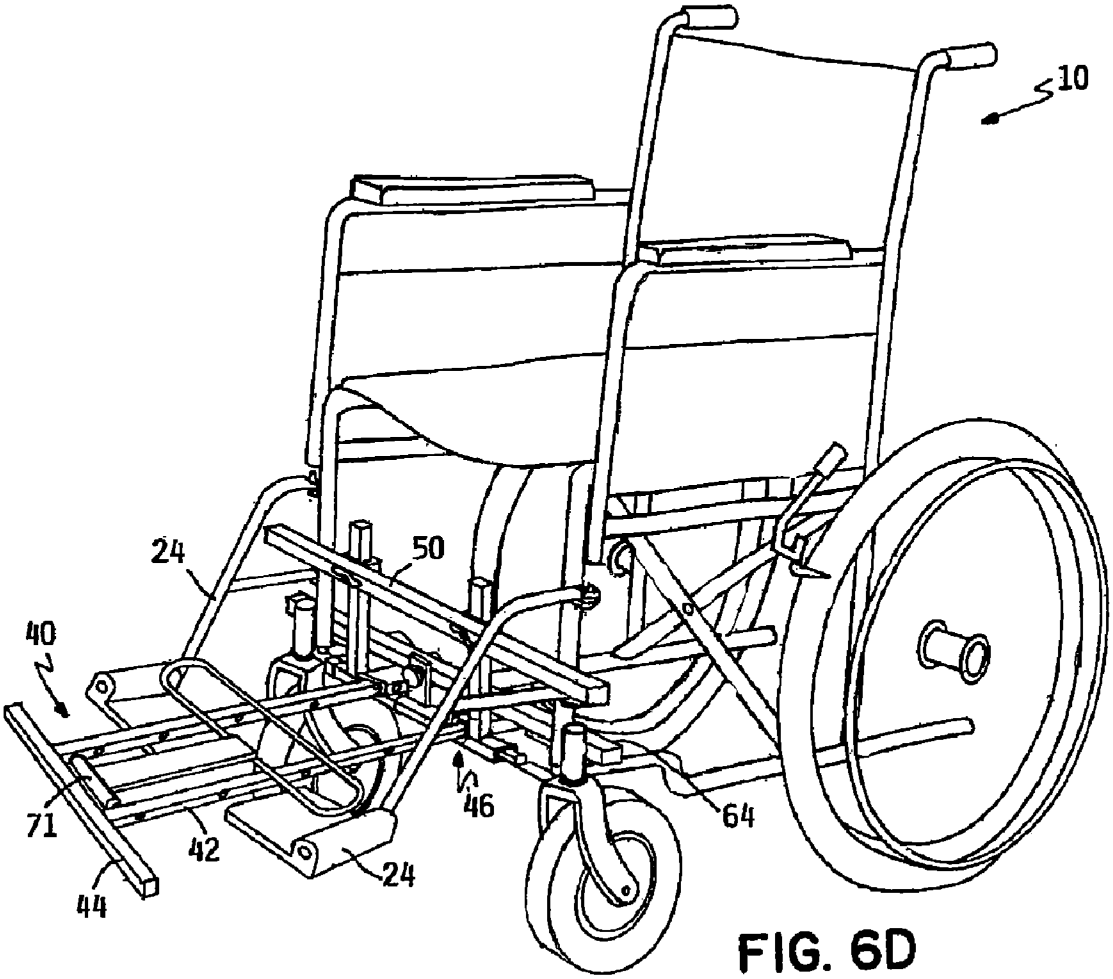
FIG. 6D is a perspective view of the wheelchair lifting attachment apparatus of FIG. 6A shown in an extended operative mode operably attached to a conventional wheelchair.

As illustrated in FIGS. 6C-6D, when the wheelchair lift attachment 40 is detachably mounted to the wheelchair 10, the backing bar member 64 provides additional support to the wheelchair connection portion 46. Particularly, the backing bar member 64 is placed on the back side of the front frame members 12*c*, 12*d* such that when it is secured to the central attachment member 62 by fastening member 65, compression pressure is exerted both on the backside of the front frame members 12*c*, 12*d* of the wheelchair 10 by the backing bar member 64 and the front side by the upper horizontal member 50. The compression pressure that is exerted is a result of the front frame members 12*c*, 12*d* being sandwiched between the backing bar member 64 and at least the upper horizontal member 50 that engages with the front side of the front frame members 12*c*, 12*d*. In a preferred embodiment, the backing bar member 64 also rests on the top side of the lower horizontal frame portion 12*e*, 12*f* to provide further support and safety measures. As previously discussed, the backing bar member 64 may contain additional frame contacting portions 64*a* to accommodate the location of the receiving members 68 without compromising the additional support and safety measures provided by interaction with the lower horizontal frame portion 12*e*, 12*f*.

In another preferred embodiment, the upper horizontal member may contain vertical frame engaging members 56*a*, 56*b*, bench members 60*a*, 60*b*, hooking members 66*a*, 66*b*, or a combination thereof as previously discussed. Also, the backing bar member 64 may also contain hooking members as previously discussed.

In another preferred embodiment, the wheelchair connection portion 46 comprises a lower horizontal member 48 with two extending members with vertical plugs 54*a*, 54*b* that operably engage the tubular apertures 28*a*, 28*b* of a conventional wheelchair 10. The wheelchair connection portion 46 also comprises two angled extending members 76*a*, 76*b* that extend away from the lower horizontal member 48. Preferably, the two angled extending members 76*a*, 76*b* diverge away from each other as they extend from the lower horizontal member 48. In this preferred embodiment, each angled extending member 76*a*, 76*b* independently operably engages a front frame member 12*c*, 12*d* of the wheelchair 10. Each of the angled extending members 76*a*, 76*b* may also contain a vertical frame engaging member 56*a*, 56*b*, a bench member 60*a*, 60*b*, a hooking member 66*a*, 66*b*, or a combination thereof to secure the respective angled extending member 76*a*, 76*b* to the respective front frame members 12*c*, 12*d*. The vertical frame engaging members 56*a*, 56*b*, bench members 60*a*, 60*b*, and hooking members 66*a*, 66*b* may be adjustable on the angled extending members 76*a*, 76*b*. The wheelchair connection portion may also have a backing bar member 64 that operably engages with the angled extending members 76*a*, 76*b*, a central attachment member 62, or a combination thereof. In this preferred embodiment, due to the angled extending members 76*a*, 76*b* operably engaging with the front frame members 12*c*, 12*d* of the wheelchair 10, the upper horizontal member 50 of the foregoing described preferred embodiments may be eliminated.

In another preferred embodiment, the wheelchair connection portion 46 is permanently attached to the wheelchair such that it cannot be removed. In this preferred embodiment, the wheelchair connection portion 46 is welded or otherwise permanently fixed to the wheelchair 10. The connecting arm members 42 and lifting member 44 are preferably detachable from the permanently connected wheelchair connection portion 46, such as an adjustable or telescoping mechanism as previously discussed.

Figure 7A:
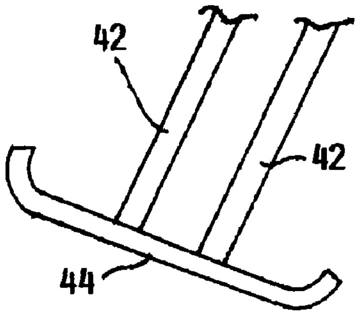
FIGS. 7A-7G is a front elevation view of the arm levers in various configurations in accordance with the teachings of the present invention.
Figure 7B:
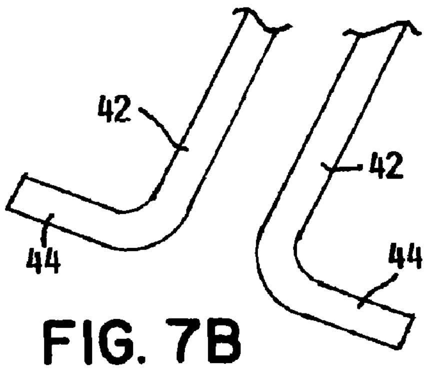
Figure 7C:
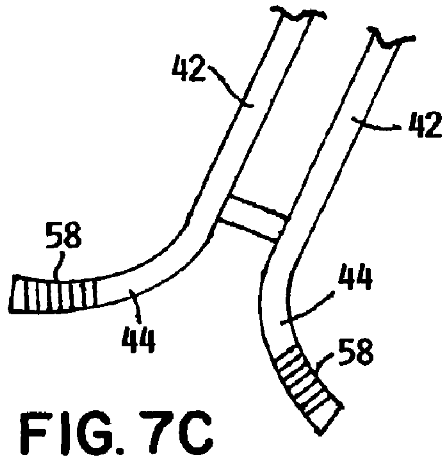
Figure 7D:
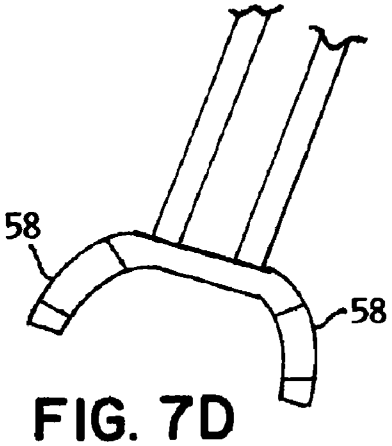
Figure 7E:
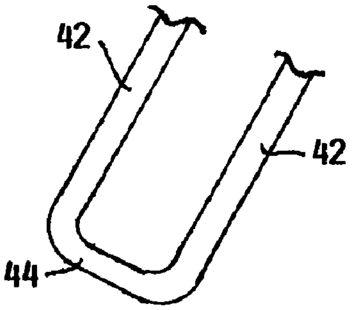
Figure 7F:
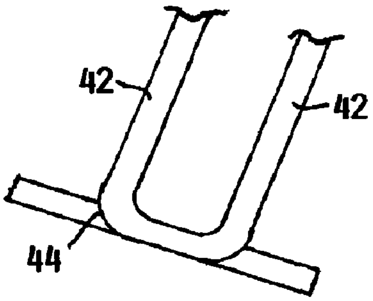
Figure 7G:
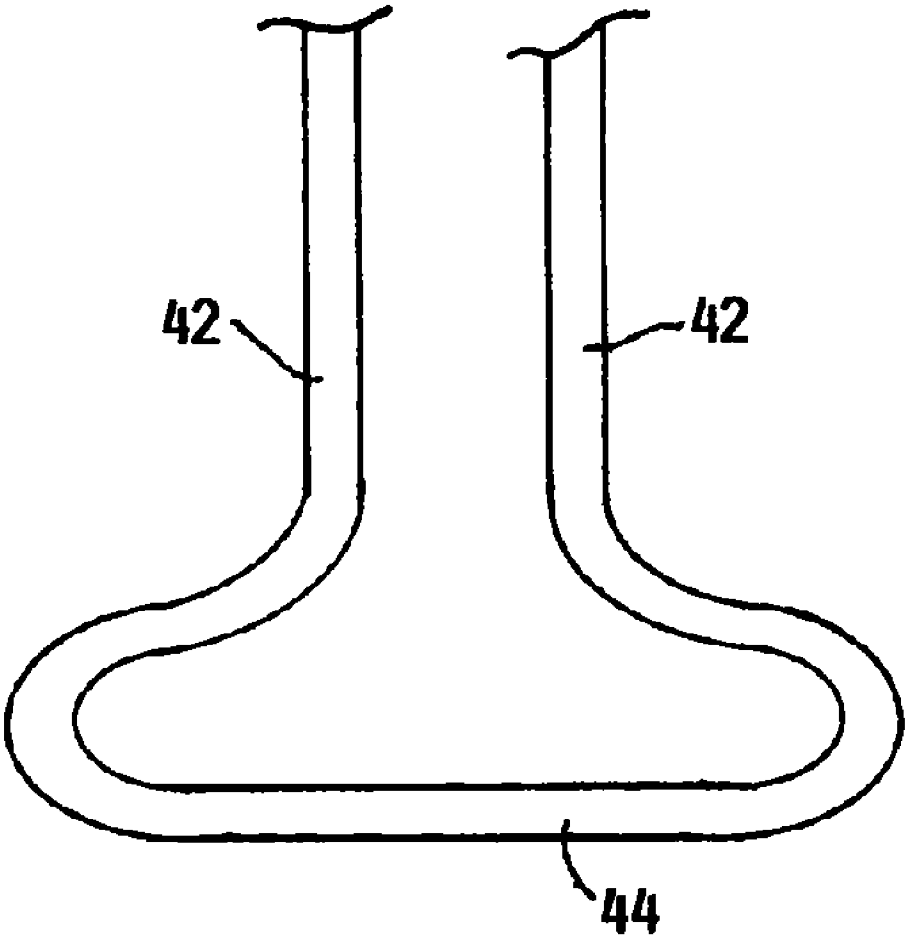

As illustrated in FIGS. 7A-7G, the connecting arm members 42 and lifting or handhold member 44 may contain various configurations. Such various configuration include the lifting member 44 having a shape that curves towards the wheelchair as illustrated in FIG. 7A; each connecting arm member 42 and lifting or handhold member 44 comprised of the same continuous material and not being connected proximate the lifting or handhold member 44 region as illustrated in FIG. 7B; each connecting arm member 42 and lifting or handhold member 44 comprised of the same continuous material and being connected proximate the lifting member 44 region as illustrated in FIG. 7C; the handhold member 44 having a shape that curves away from the wheelchair as illustrated in FIG. 7D; the connecting arm members 42 are comprised of the same continuous material to form a continuous handhold member 44 located between the connecting arm members 42 as illustrated in FIG. 7E; the connecting arm members 42 comprised of the same continuous material with additional material connected thereto such that the handhold member 44 is comprised of the material between the connecting arm members 42 and the additional material added thereto as illustrated in FIG. 7F; and the connecting arm members 42 comprised of the same continuous material to form a handhold member 44 located between and outside of the connecting arm members 42 as illustrated in FIG. 7G. The various connecting arm members 42 and lifting or handhold member 44 configurations may also include gripping means 58 to facilitate the grip of an attendant, such as handle grips, textured tape, foam, rubber, or other like material, as illustrated in FIGS. 7C and 7D.

Figure 8A:
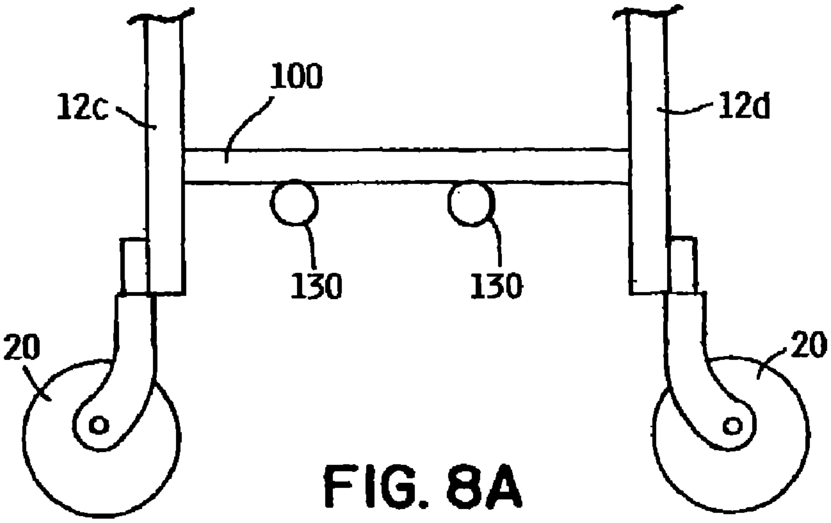
FIG. 8A is a front view of the front lower side portion of a wheelchair in accordance with the teachings of the present invention.

In another preferred embodiment, the wheelchair 10 contains one or more additional frame members spanning the distance between the lower horizontal frame members 12*c*, 12*d* proximate the front side of the wheelchair 10. Referring now to FIG. 8A is illustrated a single horizontal member 100 that spans the lower front side of the wheelchair 10 between the lower horizontal frame members 12*c*, 12*d*. In this preferred embodiment, the single horizontal member 100 comprises receiving members 130 for insertion of the ends of connecting arm members 42 connected to lifting or handhold member 44 can be inserted into. Preferably, the connecting arm members 42 are fastened into place when inserted into receiving members 130 for operational use. This may be accomplished by receiving members 130 and connecting arm members 42 containing corresponding apertures for insertion of a pin, bolt, spring-bolt, or the like fastening means. While the receiving members 130 are illustrated in a specific location with respect to the single horizontal member 100, it is contemplated in the present invention that the receiving members 130 may be located in alternative locations, such as the top portion. The receiving members 130 may also consist of various shapes to accommodate the shape of the one or more connecting arm members 42.

Figure 8B:
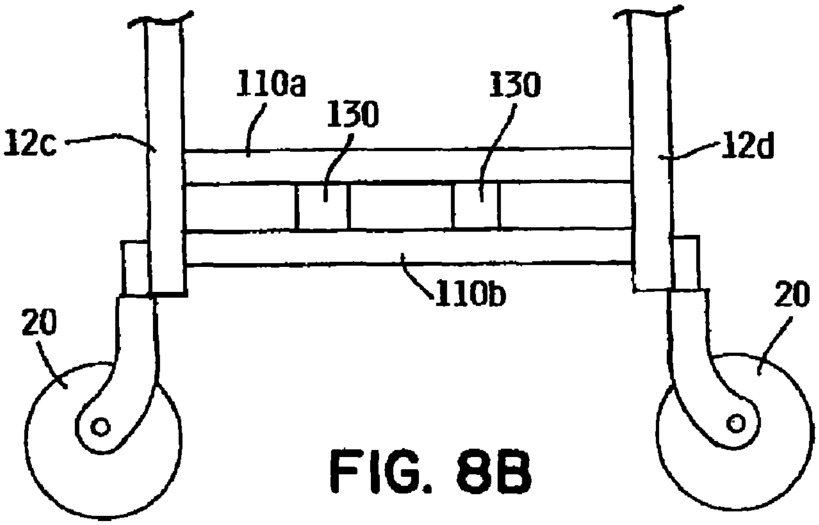
FIG. 8B is a front view of the front lower side portion of a wheelchair in accordance with the teachings of the present invention.

Referring now to FIG. 8B is two horizontal members 110*a*, 110*b* that span the lower front side of the wheelchair 10 between the lower horizontal frame members 12*c*, 12*d*. In this preferred embodiment, the two horizontal members 110*a*, 110*b* comprise receiving members 130 located between the two horizontal members 110*a*, 110*b* for insertion of the ends of connecting arm members 42. Preferably, the connecting arm members 42 are fastened into place when inserted into receiving members 130 for operational use. This may be accomplished by receiving members 130 and connecting arm members 42 containing corresponding apertures for insertion of a pin, bolt, spring-bolt, or the like fastening means. While the receiving members 130 are illustrated between the two horizontal members 110*a*, 110*b*, it is contemplated in the present invention that the receiving members 130 may be located in alternative locations, such as the top portion of horizontal bar 110*a*, the bottom portion of horizontal bar 110*b*, or the like. The receiving members 130 may also consist of various shapes to accommodate the shape of the one or more connecting arm members 42.

Figure 8C:
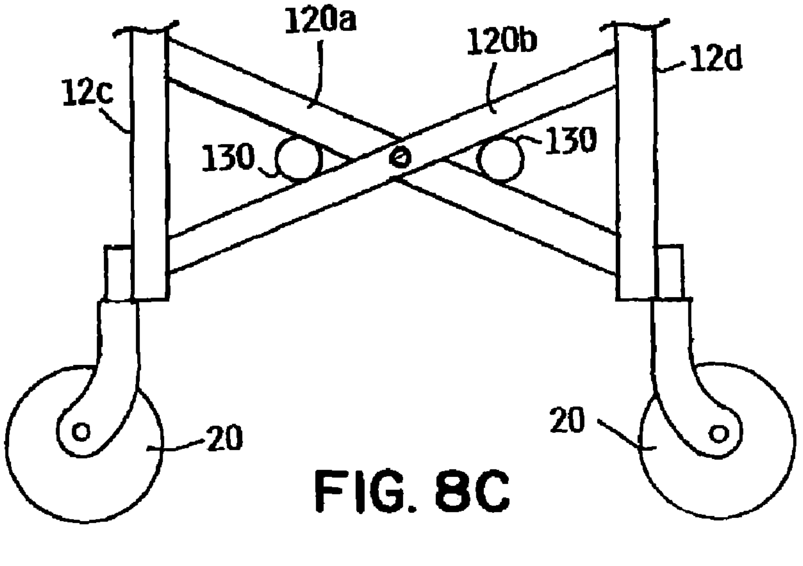
FIG. 8C is a front view of the front lower side portion of a wheelchair in accordance with the teachings of the present invention.

Referring now to FIG. 8C is two crossing members 120*a*, 120*b* that span the lower front side of the wheelchair 10 between the lower horizontal frame members 12*c*, 12*d* and that intersect with each other. In this preferred embodiment, each of the two cross members 120*a*, 120*b* comprise a receiving member 130 located in each angle of the intersecting portions of cross members 120*a*, 120*b* for insertion of the ends of connecting arm members 42. Preferably, the connecting arm members 42 are fastened into place when inserted into receiving members 130 for operational use. This may be accomplished by receiving members 130 and connecting arm members 42 containing corresponding apertures for insertion of a pin, bolt, spring-bolt, or the like fastening means. As discussed above, the receiving members are preferably located in the angle of the cross members 120*a*, 120*b*, which may be accomplished by each cross member 120*a*, 120*b* each containing a receiving member on the top portion or bottom portion. Alternatively, the back cross member 120*a* contains both receiving members 130 to prevent the wheelchair 10 from collapsing when the connecting arm members 42 are inserted into the receiving members 130 as a result of the connecting arm members 42 being between the cross members 120*a*, 120*b*. Alternatively, the receiving members 130 of the may be located in alternative locations, such as the top portion of one or both cross members 120*a*, 120*b*, the lower portion of one or both cross members 120*a*, 120*b*, or the like.

Referring to FIGS. 8A-8C, the connecting arm members 42 may be adjusted to a retracted position, such as illustrated in the detachable wheelchair lift attachment 40 as illustrated in FIG. 6C whereby at least a portion of the connecting arm members 42 may slide under the seat 14 of the wheelchair 10 proximate the scissor-mechanism 12*i* of the frame. The connecting arm members 42 may adjustably slide from the retracted position, FIG. 6C, to an extended operative position, FIG. 6D, or an intermediate position thereto. In either the retracted position, the extended position, or an intermediate position, the connecting arm members 42 may be locked in place by fastening means, such as a pin, nut and bolt, or the like. Alternatively, the connecting arm members 42 with the lifting or handhold member 44 may be disconnected from the wheelchair 10 altogether by removing the ends of the connecting arm members 42 from the receiving members 130 of the wheelchair 10 when not in an operational mode.

In a preferred embodiment, the wheelchair lift attachment components and permanent wheelchair components of the present invention are comprised of a robust material, such as steel, aluminum, iron, or any other metal or metal alloy. In a preferred embodiment, the wheelchair lift attachment components and permanent wheelchair components are comprised of the same material as the wheelchair. The wheelchair lift attachment of the present invention may also consist of various shaped materials, such as square-tubular, cylindrical or other shaped materials, and may be solid or hollow. One of ordinary skill in the art will appreciate these variations in the design without departing from the spirit and scope of the present invention.

The invention claimed is:

1. A wheelchair comprising:

a seat and a backrest supported by a frame member;

at least two wheels connected to the frame member;

a first front vertical frame member spaced a distance from a second front vertical frame member; and at least one front frame member spanning the distance between the first and second vertical frame members, the at least one front frame member located below a plane defined by the seat, and the front frame member containing at least two receiving members located between the first and second vertical frame members for operably attaching a lifting apparatus.

2. The wheelchair of claim 1, wherein the wheelchair is capable of being folded.

3. The wheelchair of claim 2, further comprising a second front frame member spanning the distance between the first and second vertical frame members, wherein the at least one front frame member and the second front frame member operably engage to form a scissor-mechanism configuration that is capable of being folded when the wheelchair is folded.

4. The wheelchair of claim 3, wherein one of the at least two receiving members is located on the at least one front frame member.

5. The wheelchair of claim 3, wherein the at least two receiving members are located on the at least one front frame member.

6. The wheelchair of claim 1, wherein the at least one front frame member comprises a first front frame member and a second front frame member that are substantially parallel to each other.

7. The wheelchair of claim 6, wherein the at least two receiving members are located between the first front frame member and the second front frame member.

8. The wheelchair of claim 7, wherein the at least two receiving members are connected to both the first front frame member and the second front frame member.

9. The wheelchair of claim 1, wherein the at least two receiving members are located above the at least one front frame member.

10. The wheelchair of claim 1, wherein the at least two receiving members are located below the at least one front frame member.

11. The wheelchair of claim 1, further comprising the lifting apparatus operably attached to the at least two receiving members, the lifting apparatus capable of being adjusted between a retracted position and an extended operative position.

12. A wheelchair comprising:

at least two wheels connected to a frame;

a seat supported in a substantially horizontal configuration by the frame; and at least two receiving members connected to the frame for operably attaching a lifting apparatus;

wherein the frame has a first front frame member spaced a distance from a second front frame member, the first and second front frame members located proximate a front portion of the seat, the first and second front frame members extending away from the seat in a direction towards the ground during a normal mode of operation, and the at least two receiving members located below the seat and between the first and second front frame members.

13. The wheelchair of claim 12, further comprising a third front frame member spanning the distance between the first and second front frame members.

14. The wheelchair of claim 13, wherein the at least two receiving members are connected to the third front frame member.

15. The wheelchair of claim 13, further comprising a fourth front frame member spanning the distance between the first and second front frame members, wherein the third and fourth front frame members operably engage to form a scissor-mechanism configuration that is capable of being folded when the wheelchair is folded.

16. The wheelchair of claim 12, further comprising the lifting apparatus operably attached to the at least two receiving members, the lifting apparatus capable of being adjusted between a retracted position and an extended operative position.

17. A wheelchair comprising:

at least two wheels connected to a frame;

a seat supported by the frame; and a lifting apparatus operably connected to the frame;

wherein the frame has a first front frame member spaced a distance from a second front frame member, the first and second front frame members located proximate a front portion of the seat, the first and second front frame members extending away from the seat in a direction towards the ground during a normal mode of operation, and at least two receiving members located between the first and second front frame members for operably connecting the lifting apparatus; and wherein the lifting apparatus is located below the seat and between the first and second front frame members.

18. The wheelchair of claim 17, wherein the lifting apparatus is capable of being adjusted between a retracted position and an extended operative position.

19. The wheelchair of claim 17, further comprising a leg support structure operably connected to the first front frame member, the leg support structure located below the seat.

20. The wheelchair of claim 17, further comprising a third front frame member spanning the distance between the first and second front frame members, wherein at least one of the at least two receiving members are connected to the third front frame member.

* * * * *